(12) United States Patent
Uchiyama et al.

(10) Patent No.: US 9,713,014 B2
(45) Date of Patent: Jul. 18, 2017

(54) COMMUNICATION CONTROL APPARATUS, COMMUNICATION CONTROL METHOD, PROGRAM, AND TERMINAL APPARATUS

(71) Applicant: SONY CORPORATION, Tokyo (JP)

(72) Inventors: Hiromasa Uchiyama, Kanagawa (JP); Ryo Sawai, Tokyo (JP); Ryota Kimura, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/761,393

(22) PCT Filed: Nov. 27, 2013

(86) PCT No.: PCT/JP2013/081912
§ 371 (c)(1),
(2) Date: Jul. 16, 2015

(87) PCT Pub. No.: WO2014/119112
PCT Pub. Date: Aug. 7, 2014

(65) Prior Publication Data
US 2015/0358831 A1    Dec. 10, 2015

(30) Foreign Application Priority Data

Jan. 30, 2013    (JP) ................................. 2013-015380

(51) Int. Cl.
| | | |
|---|---|---|
| *H04W 40/00* | (2009.01) | |
| *H04W 16/18* | (2009.01) | |
| *H04W 16/32* | (2009.01) | |
| *H04W 16/22* | (2009.01) | |
| *H04W 24/02* | (2009.01) | |
| *H04W 84/20* | (2009.01) | |
| *H04W 88/04* | (2009.01) | |

(52) U.S. Cl.
CPC ........... *H04W 16/18* (2013.01); *H04W 16/22* (2013.01); *H04W 16/32* (2013.01); *H04W 24/02* (2013.01); *H04W 84/20* (2013.01); *H04W 88/04* (2013.01)

(58) Field of Classification Search
USPC ......... 455/443, 422.1, 452.1, 406, 436, 445; 370/331, 228
See application file for complete search history.

(56) References Cited

U.S. PATENT DOCUMENTS 7,142,861 B2 * 11/2006 Murai .................... H04J 11/004
455/443
8,755,802 B1 * 6/2014 Butala .................. H04W 48/12
455/436
(Continued)

FOREIGN PATENT DOCUMENTS

| JP | 2002-111689 A | 4/2002 |
|---|---|---|
| JP | 2004-129042 A | 4/2004 |

(Continued)

OTHER PUBLICATIONS

NTT DOCOMO, Inc., "Requirements, Candidate Solutions & Technology Roadmap for LTE REL-12 Onward", 3GPP Workshop on Release 12 and Onwards, RWS-120010, Jun. 11-12, 2012, pp. 27, Ljubljana, Slovenia.

(Continued)

*Primary Examiner* — David Q Nguyen
(74) *Attorney, Agent, or Firm* — Chip Law Group

(57) ABSTRACT

Provided is a communication control apparatus including: a selection unit that uses information related to one or more terminal apparatuses operable as an access point for a small cell to select a master terminal operating the small cell and one or more sub-master terminals; and a control unit that instructs the at least one sub-master terminal to be involved in an operation of the small cell according to occurrence of an event disturbing the operation of the small cell by the master terminal.

18 Claims, 26 Drawing Sheets

(56) References Cited

U.S. PATENT DOCUMENTS

| | | | |
|---|---|---|---|
| 8,902,850 B2 * | 12/2014 | Choi-Grogan | H04W 36/0027 370/331 |
| 2008/0188177 A1 | 8/2008 | Tan et al. | |
| 2010/0182916 A1 | 7/2010 | Drewes et al. | |
| 2010/0261467 A1 * | 10/2010 | Chou | H04W 24/02 455/422.1 |
| 2011/0019606 A1 | 1/2011 | Umeda et al. | |
| 2013/0310058 A1 * | 11/2013 | Ibrahim | H04W 72/082 455/452.1 |
| 2014/0235201 A1 * | 8/2014 | Gurajala | G06Q 30/016 455/406 |
| 2015/0119047 A1 * | 4/2015 | Macias | H04W 52/0206 455/444 |

FOREIGN PATENT DOCUMENTS

| | | |
|---|---|---|
| JP | 2010-124058 A | 6/2010 |
| JP | 2011-015058 A | 1/2011 |
| JP | 2011-120173 A | 6/2011 |
| WO | 2011/153507 A2 | 12/2011 |

OTHER PUBLICATIONS

Extended European Search Report for EP Patent Application No. 13873807.5, issued on Jul. 18, 2016, 10 pages.

* cited by examiner

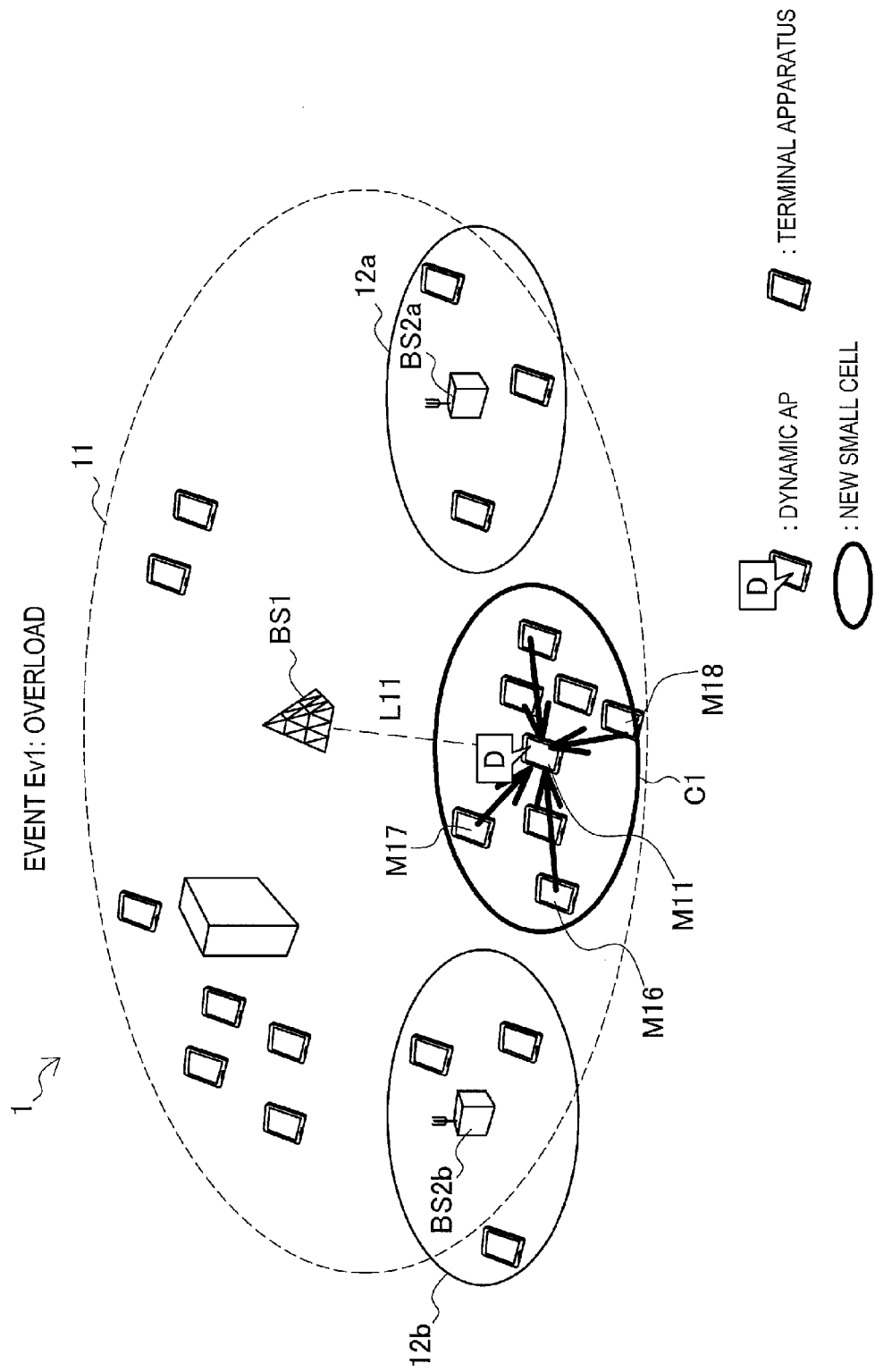

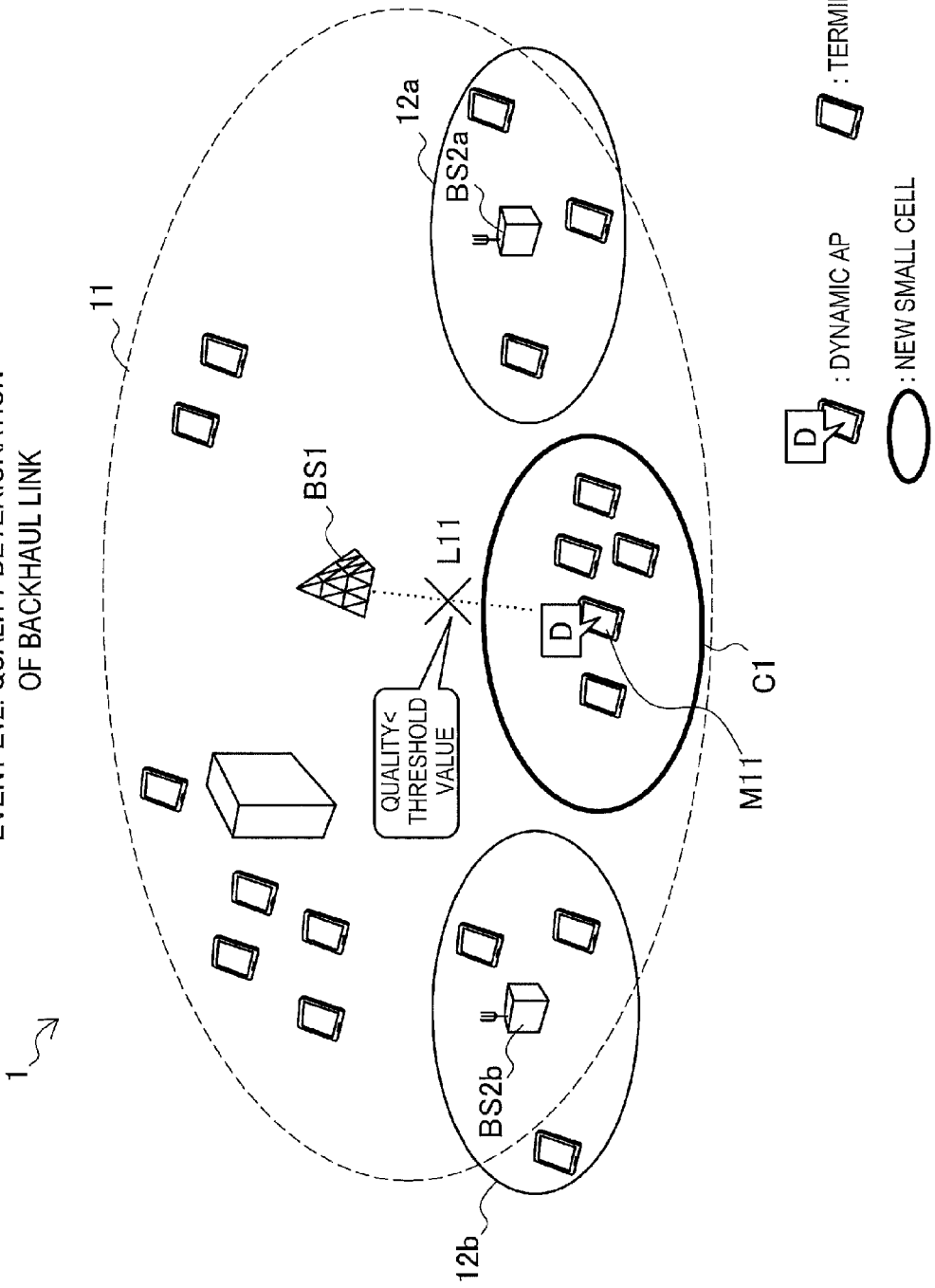

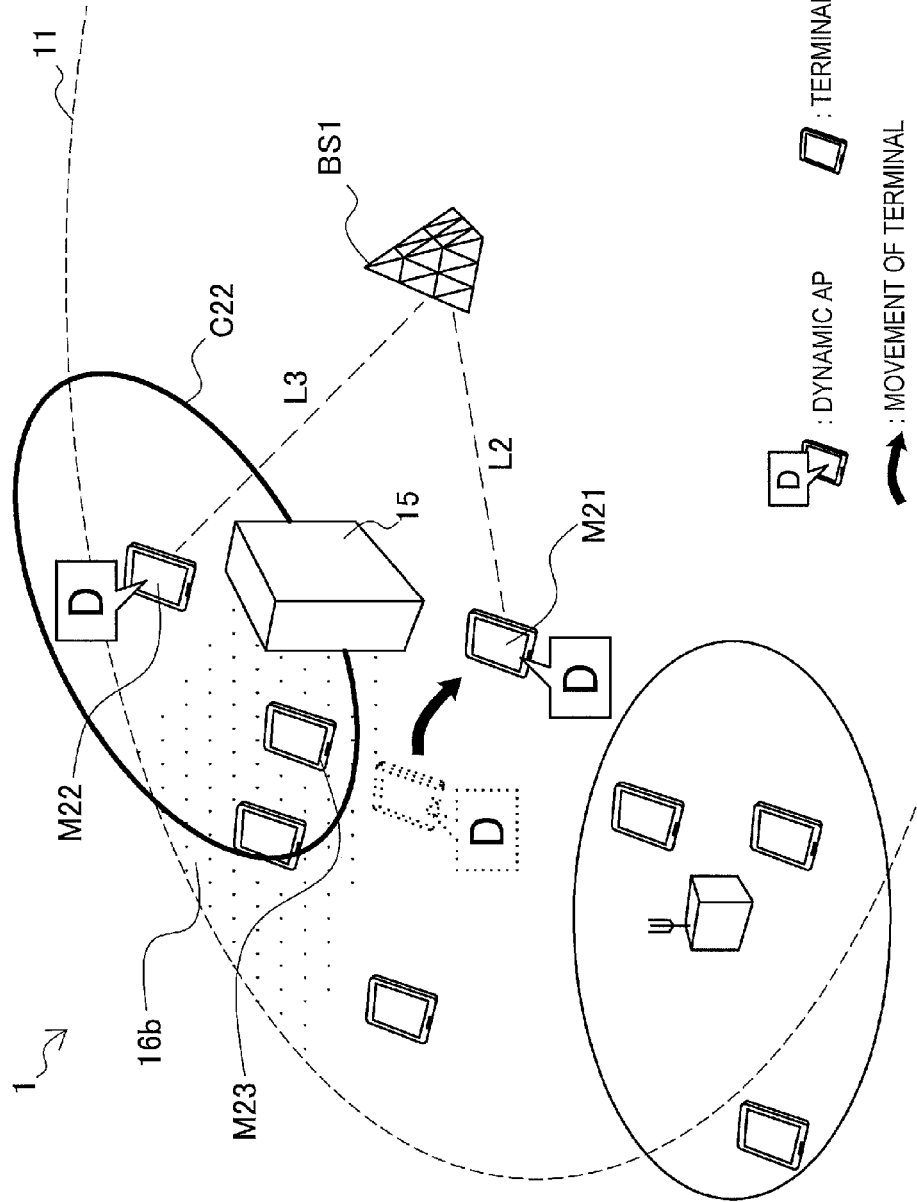

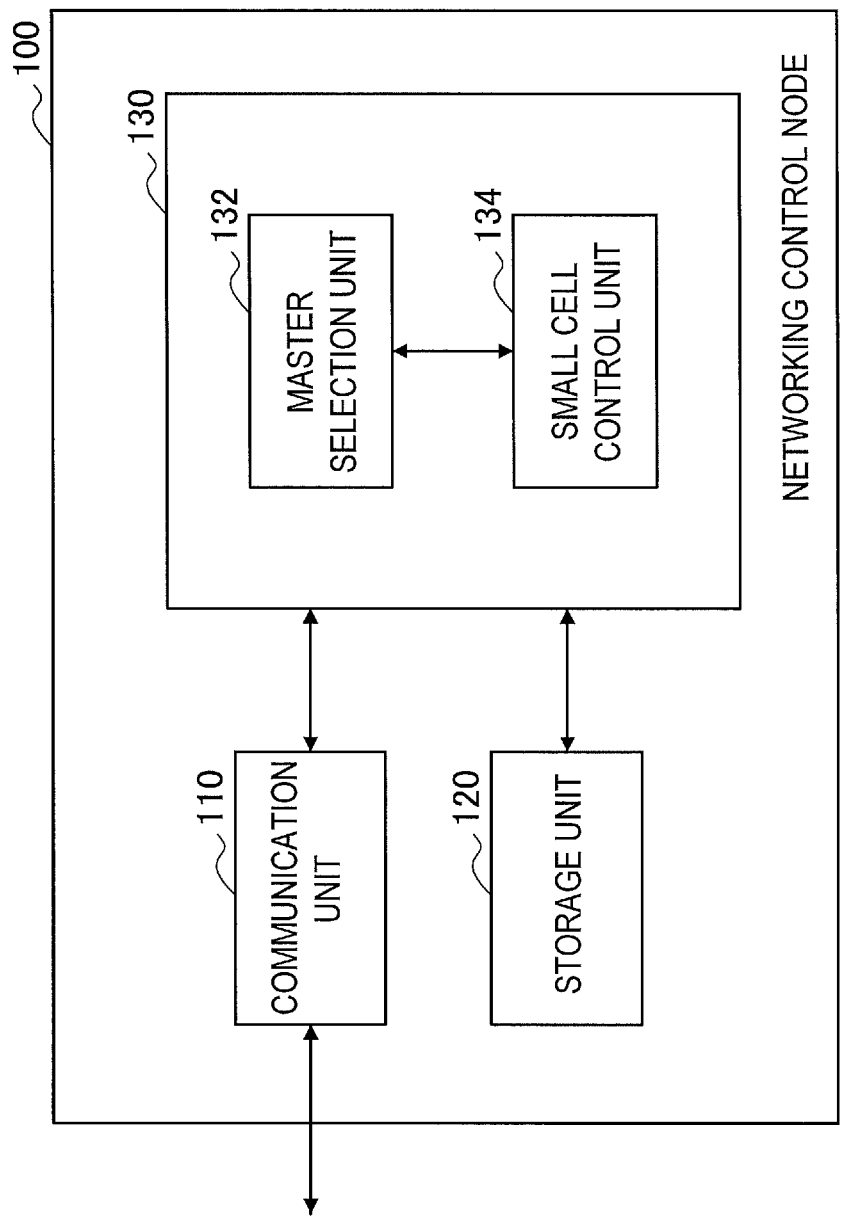

FIG.9A

| ID | MASTER TERMINAL CANDIDATE | ACCOMMODATED TERMINAL COUNT | ACCOMMODATED TERMINAL COMMUNICATION AMOUNT | COVERAGE | SCORE |
|---|---|---|---|---|---|
| M11 | SELECTED | 4 | HIGH | LARGE | $S_1(M11)$ |
| M12 | SELECTED | 4 | HIGH | MIDDLE | $S_1(M12)$ |
| M13 | SELECTED | 4 | HIGH | MIDDLE | $S_1(M13)$ |
| M14 | SELECTED | 1 | LOW | SMALL | $S_1(M14)$ |
| M15 | NON-SELECTED | | | | |

SCORING RESULT: $\underbrace{S_1(M11)}_{\text{MASTER}} > \underbrace{S_1(M12)}_{\text{SUB-MASTER}} \geq \underbrace{S_1(M13)}_{\text{SUB-MASTER}} > S_1(M14)$

FIG.9B

| ID | MASTER TERMINAL CANDIDATE | SPECIFIC CONDITION | ACCOMMODATED TERMINAL QUALITY | SCORE |
|---|---|---|---|---|
| M11 | SELECTED | SATISFIED | LOW | $S_2(M11)$ |
| M12 | SELECTED | SATISFIED | MIDDLE | $S_2(M12)$ |
| M13 | SELECTED | SATISFIED | MIDDLE | $S_2(M13)$ |
| M14 | SELECTED | NON-SATISFIED | | |
| M15 | NON-SELECTED | | | |

SCORING RESULT: $\underbrace{S_2(M11)}_{\text{MASTER}} > \underbrace{S_2(M12)}_{\text{SUB-MASTER}} \geq \underbrace{S_2(M13)}_{\text{SUB-MASTER}}$

[M] : MASTER TERMINAL  [SM] : SUB-MASTER TERMINAL  [TM] : PROVISIONAL MASTER TERMINAL

ALLOCATED FREQUENCY  C1 → F1
C1b → F1b(≠F1)

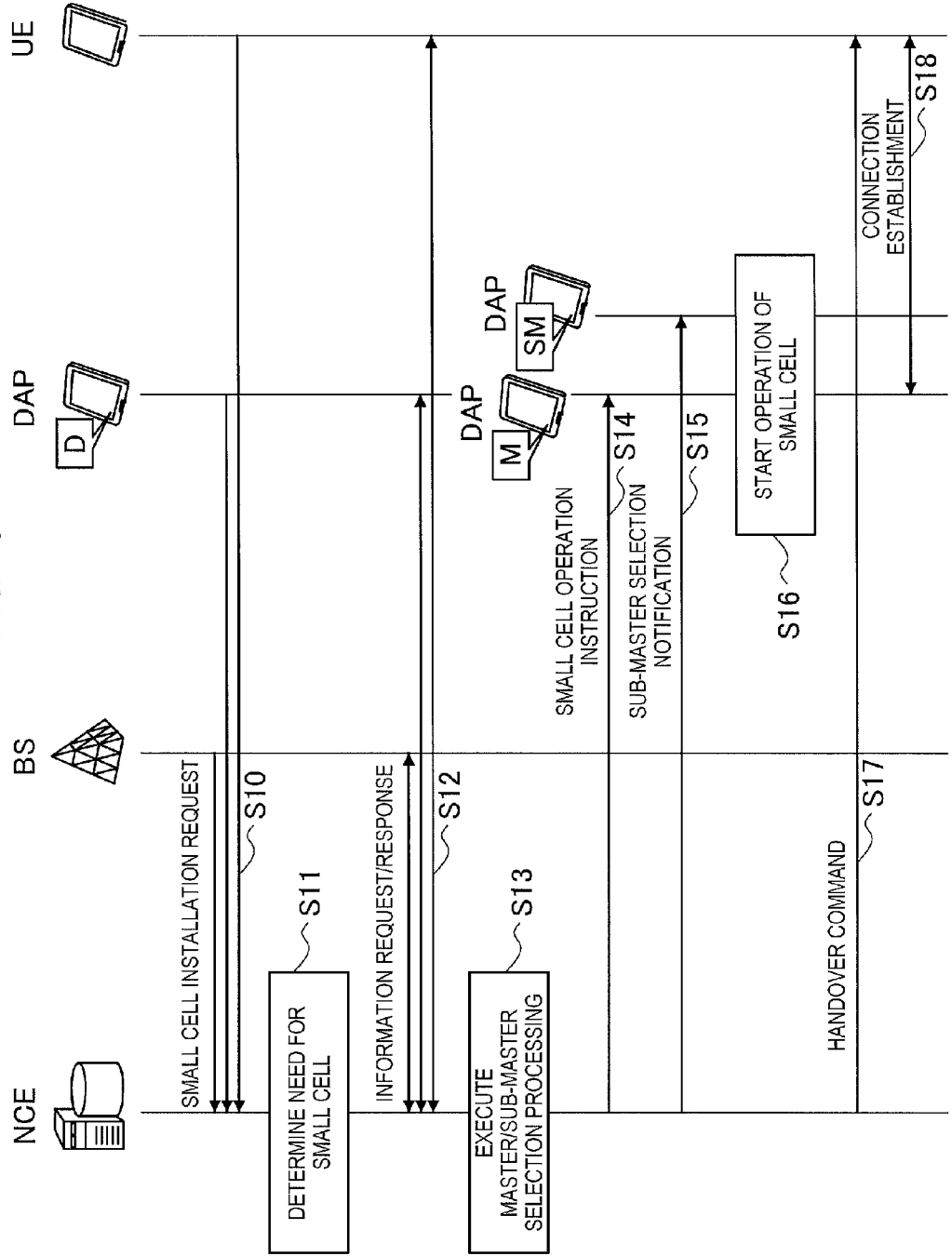

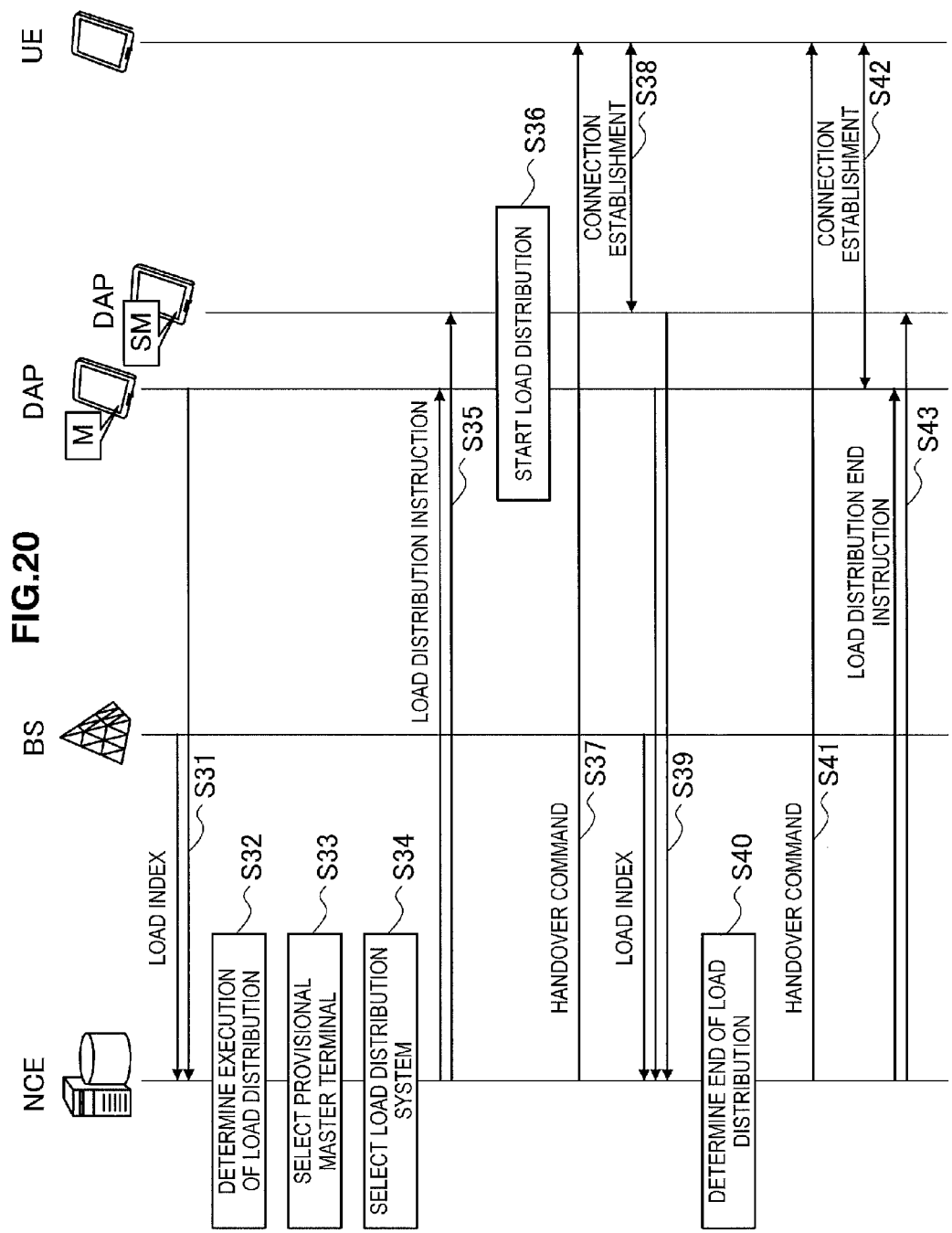

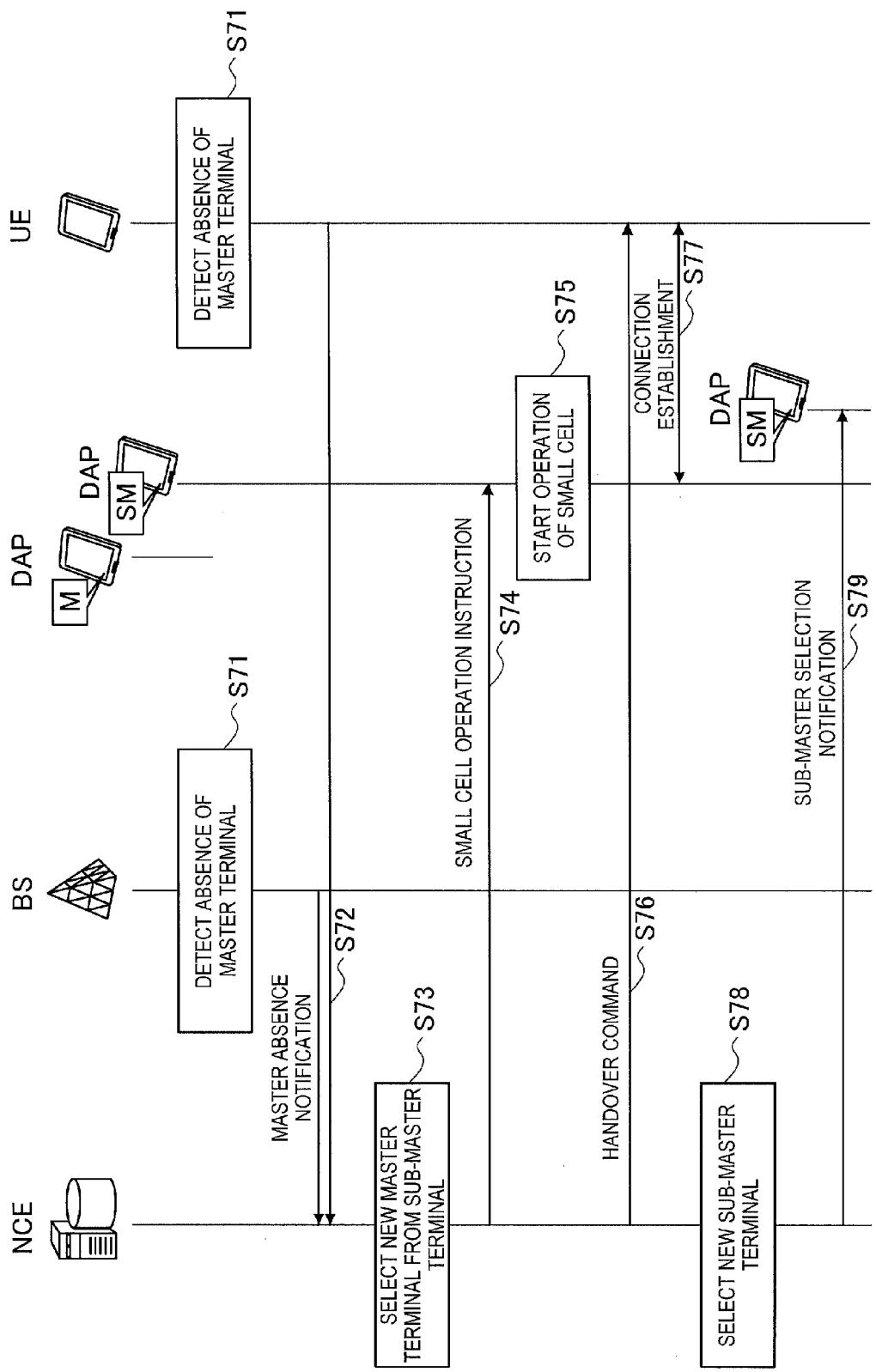

COMMUNICATION CONTROL APPARATUS, COMMUNICATION CONTROL METHOD, PROGRAM, AND TERMINAL APPARATUS

TECHNICAL FIELD

The present disclosure relates to a communication control apparatus, a communication control method, a program, and a terminal apparatus.

BACKGROUND ART

A recent radio communication environment has been facing the problem of depletion of frequency resources due to a rapid increase in data traffic. Accordingly, as one of measures against the depletion of the frequency resources, a heterogeneous network has been attracting attention. The heterogeneous network is a network that is formed by allowing various cells different in a radio access technology, a cell size or a frequency band to coexist. For example, there is proposed that, for the fifth-generation (5G) radio communication system after the 3GPP Release 12, a relatively low frequency band is allocated to a macro cell and a relatively high frequency band is allocated to a small cell to allow the macro cell and the small cell to be overlapped with each other (see Non-Patent Literature 1 below). Accordingly, network density can be enhanced and communication efficiency (for example, system capacity or communication quality) can be improved.

CITATION LIST

Non-Patent Literature

Non-Patent Literature 1: NTT DOCOMO, INC., "Requirements, Candidate Solutions & Technology Roadmap for LTE Rel-12 Onward", 3GPP Workshop on Release 12 and onwards, Ljubljana, Slovenia, Jun. 11-12, 2012

SUMMARY OF INVENTION

Technical Problem

However, due to movement of a terminal, a fading or a shadowing, the optimal arrangement of the cells dynamically changes. Therefore, it is beneficial to utilize a terminal apparatus operable as an access point (AP) for the small cell (hereinafter referred to as a dynamic AP) to allow the dynamic AP to dynamically configure the small cell according to a situation. However, the individual dynamic AP is not always excellent in processing performance and communication quality of a backhaul link compared with a base station fixedly installed. For example, when the dynamic AP operating the small cell as a master terminal stops its function due to overload, if it is necessary to start over again reconfiguration of the small cell including reselection of the master terminal, a signaling overhead becomes significant, potentially resulting in a measurable delay. Further, the fact that the dynamic AP can move (that is, mobility), in addition to its performance and quality, may adversely affect a stable operation of the small cell.

Accordingly, it is desirable that a system for ensuring a stable operation of the small cell when the dynamic AP is utilized is provided.

Solution to Problem

According to the present disclosure, there is provided a communication control apparatus including: a selection unit that uses information related to one or more terminal apparatuses operable as an access point for a small cell to select a master terminal operating the small cell and one or more sub-master terminals; and a control unit that instructs the at least one sub-master terminal to be involved in an operation of the small cell according to occurrence of an event disturbing the operation of the small cell by the master terminal.

According to the present disclosure, there is provided a communication control method including: using information related to one or more terminal apparatuses operable as an access point for a small cell to select a master terminal operating the small cell and one or more sub-master terminals; and instructing the at least one sub-master terminal to be involved in an operation of the small cell according to occurrence of an event disturbing the operation of the small cell by the master terminal.

According to the present disclosure, there is provided a program that allows a computer that controls a communication control apparatus to function as: a selection unit that uses information related to one or more terminal apparatuses operable as an access point for a small cell to select a master terminal operating the small cell and one or more sub-master terminals; and a control unit that instructs the at least one sub-master terminal to be involved in an operation of the small cell according to occurrence of an event disturbing the operation of the small cell by the master terminal.

A terminal apparatus operable as an access point for a small cell, the terminal apparatus including: a communication unit that communicates with a communication control apparatus that selects a master terminal operating a small cell, and one or more sub-master terminals; and a control unit that, after the terminal apparatus is selected as the sub-master terminal by the communication control apparatus, when an event disturbing an operation of the small cell by the master terminal occurs, allows the terminal apparatus to be involved in an operation of the small cell according to an instruction from the communication control apparatus.

Advantageous Effects of Invention

According to the technology according to the present disclosure, it is possible to provide a system for ensuring a stable operation of a small cell when a dynamic AP is utilized.

BRIEF DESCRIPTION OF DRAWINGS

FIG. 4 is an explanatory diagram for explaining a first example of an event disturbing an operation of the small cell.

FIG. 5 is an explanatory diagram for explaining a second example of an event disturbing an operation of the small cell.

FIG. 6 is an explanatory diagram for explaining a third example of an event disturbing an operation of the small cell.

FIG. 7 is a block diagram illustrating an example of a configuration of a networking control node according to an embodiment.

FIG. 9A is an explanatory diagram for explaining an example of selection of a master terminal and a sub-master terminal based on a communication efficiency score.

FIG. 9B is an explanatory diagram for explaining another example of selection of the master terminal and the sub-master terminal based on the communication efficiency score.

FIG. 19 is a sequence diagram illustrating an example of a flow of processing related to selection of the master terminal and the sub-master terminal.

FIG. 20 is a sequence diagram illustrating an example of a flow of processing related to the overload event.

FIG. 22 is a sequence diagram illustrating an example of a flow of processing related to the master absence event.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Furthermore, note that description will be provided in the following order.

1. Outline of technology
2. Configuration of networking control node
3. Flow of processing
4. Configuration of dynamic AP
5. Processing sequence
6. Application example
7. Summary <1. Outline of Technology>

First, an outline of the technology according to the present disclosure will be discussed using FIG. 1 to FIG. 6.

[1-1. Example of Heterogeneous Network]

Figure 1:
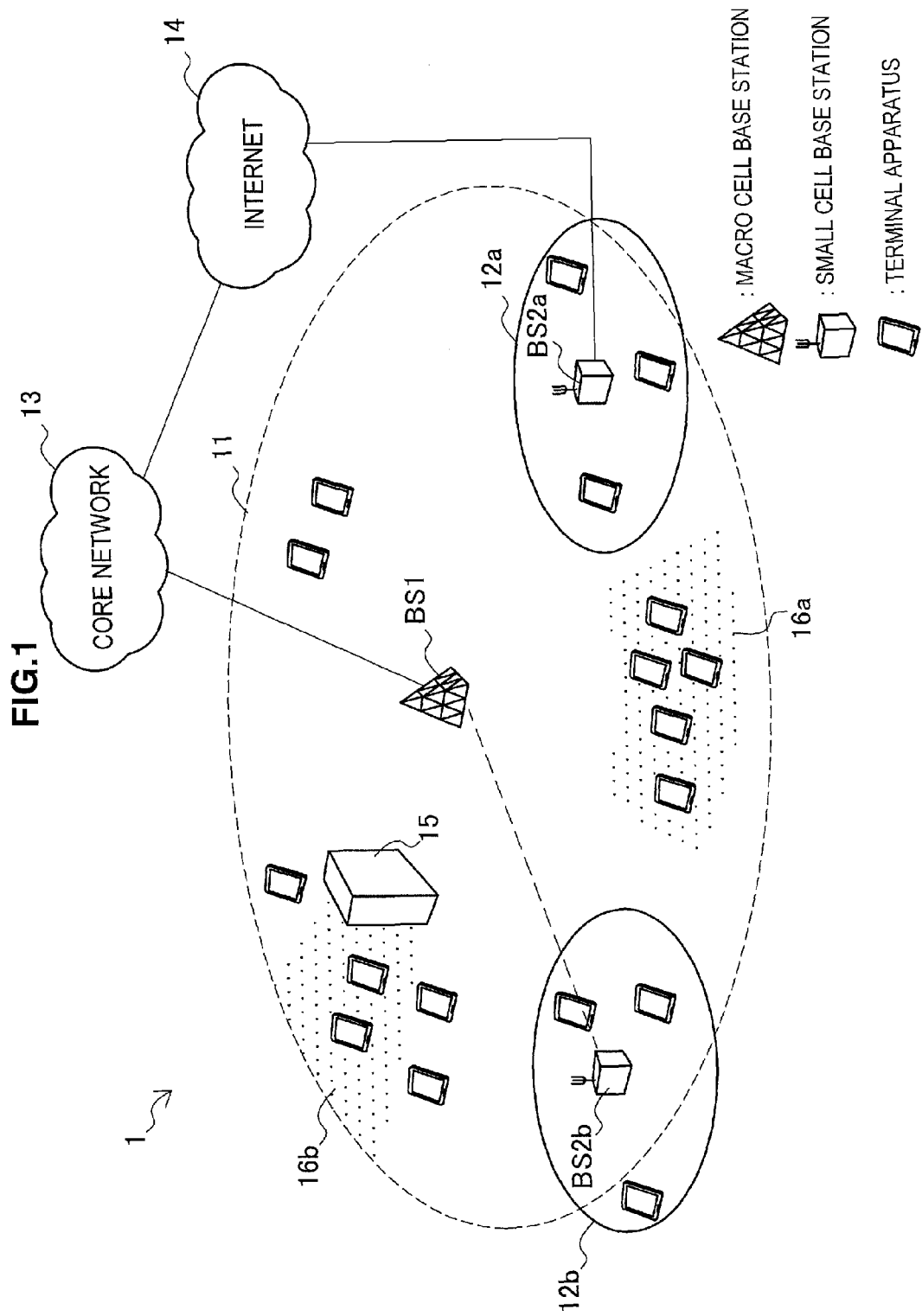
FIG. 1 is an explanatory diagram for explaining an example of a configuration of a heterogeneous network.

FIG. 1 is an explanatory diagram for explaining an example of a configuration of a heterogeneous network. With reference to FIG. 1, a heterogeneous network 1 as an example is illustrated. The heterogeneous network 1 includes a macro cell 11, a small cell 12a, and a small cell 12b. The small cell 12a and the small cell 12b are partially overlapped with the macro cell 11, respectively.

The macro cell 11 is a large-sized cell operated by a base station BS1. As an example, a radius of the macro cell 11 may be in a range from hundreds of meters to tens of kilometers. When the base station BS1 operates according to a long term evolution (LTE) system, the base station BS1 can be called an evolved node B (eNB). Note that the base station BS1 is not limited to such an example, and may operate according to other cellular communication systems such as an LTE-advanced (LTE-A) system, a WiMAX system or a wideband-code division multiple access (W-CDMA) system. The base station BS1 is connected to a core network 13. The core network is connected to the Internet 14.

The small cell is a small-sized cell compared with the macro cell. The small cell 12a is operated by a base station BS2a. The small cell 12b is operated by a base station BS2b. The small cell herein means a concept including various kinds of relatively small cells such as a femto cell, a nano cell, a pico cell and a micro cell. Classification of the small cells as an example is shown in Table 1. Note that the technology according to the present disclosure can be also applied to types of cells not shown in Table 1.

TABLE 1

| Classification of small cells | | | |
|---|---|---|---|
| Category | IF example | Accommodation rate | Access type |
| Pico cell | S1, X2 | High | Open |
| Femto cell | X2 tunneling | Middle | Open/Closed |
| RRH | Optical fiber | High | Open |
| Hot zone | S1, X2 | High | Open |
| Relay station | Air IF | High | Open |

In Table 1, the "category" shows a small cell itself or a type of a small cell base station. The "IF example" shows an example of a communication interface (or a communication medium) usable by the small cell base station to communicate with a macro cell station or other control nodes. The pico cell can communicate, for example, with a control node within a core network via the S1 interface, and with other base stations via the X2 interface. The femto cell can communicate with other base stations by using the X2 tunneling protocol. The remote radio head (RRH) can communicate with the macro cell base station via the optical fiber. Similarly to the pico cell, the hot zone base station can communicate with the control node within the core network via the S1 interface, and with other base stations via the X2 interface. The relay station can communicate with the macro cell base station via the air interface. The "accommodation rate" is an index indicating how many mobile stations (corresponding to UEs in the LTE system; referred to also as mobile stations) one cell can accommodate. The accommodation rate of the femto cell is slightly lower compared with those of the pico cell, the RRH, the hot zone base station and the relay station. The "access type" is classification relating to acceptance of access from the terminals. All of the terminals can be connected to the cells of the open access type in principle, while only the previously-registered terminal can be connected to the cells of the closed access type in principle.

[1-2. Utilization of Dynamic AP]

In the heterogeneous network 1 exemplified in FIG. 1, a position of the terminal changes over time. A communication environment in the inside of the macro cell may change due to a fading, a shadowing, or the like. Therefore, although the small cell 12a and the small cell 12b are arranged in the heterogeneous network 1 in order to improve communication efficiency, the arrangement of these small cells is not always optimal over a long time of period. For example, in the example of FIG. 1, a region 16a is crowded with the plurality of terminals. Therefore, if an access point for a new small cell is arranged in the region 16a, the communication efficiency would be further improved as a result of the fact that the new small cell accommodates many terminals. Further, since a region 16b is positioned behind an obstacle 15 when viewed from the base station BS1, even when the terminal existing in the region 16b is connected to the macro cell 11, only poor communication quality is obtained. Therefore, the communication efficiency would be also improved by arranging an access point for a new small cell accommodating the terminal existing in the region 16b.

In order to configure such dynamic small cells, the technology according to the present disclosure utilizes the dynamic AP described above. Classification of the dynamic APs as an example is shown in Table 2. Note that the technology according to the present disclosure can be also applied to dynamic APs not shown in Table 2.

TABLE 2

Classification of dynamic access points (AP)

| Category | IF example | AP function | Battery | Accommodation rate | Access type |
|---|---|---|---|---|---|
| Mobile router terminal | Air IF | Unique | Large | Low | Open/closed |
| General terminal | Air IF | Download | Small | Low | Open/closed |

In Table 2, the "category" shows a type of the dynamic AP. The "IF example" shows an example of a communication interface usable by the dynamic AP to communicate with the base station or other control nodes. Both of the mobile router terminal and the general terminal can communicate with the base station via the air interface. The air interface herein may be a radio interface of a cellular system provided by the macro cell or the small cell. Instead, the dynamic AP may communicate with the base station via the air interface (and a wired network beyond the air interface) of a non-cellular system such as a wireless LAN, Bluetooth (registered trademark), or Zigbee (registered trademark). The "AP function" shows how to realize a function for operating as the access point. The mobile router terminal is a terminal previously mounting a unique access point function. The general terminal is a terminal operable as the access point by downloading a function module for the access point function in an ex-post manner. The "battery" shows an average size of battery capacity of the terminal. The battery capacity of the mobile router terminal is often greater than that of the general terminal. The "accommodation rate" is an index showing how many terminals one AP can accommodate. Compared with the various base stations described above, typically, the accommodation rate of the dynamic AP is low. The "access type" is classification relating to acceptance of access from the terminal. The access type of the dynamic AP may be the open access type, or may be the closed access type.

Figure 2:
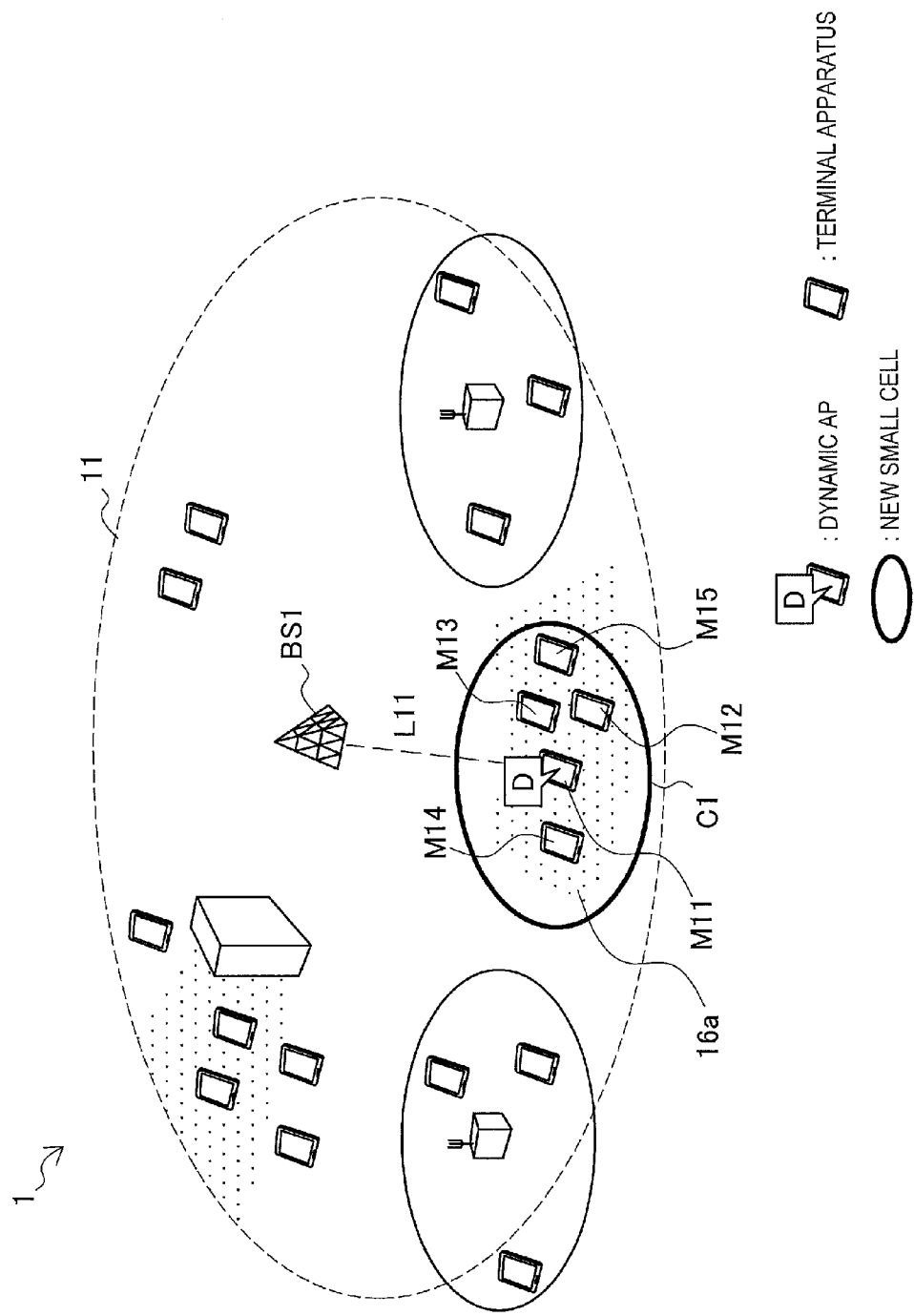
FIG. 2 is a first explanatory diagram for explaining a small cell operable by a dynamic AP.

FIG. 2 is a first explanatory diagram for explaining the small cell operable by the dynamic AP. With reference to FIG. 2, a small cell C1 is operated by a terminal apparatus M11 positioned in the region 16a. The terminal apparatus M11 is a dynamic AP operable as an access point for the small cell. In this specification, the dynamic AP actually operating the small cell is called a master terminal. The small cell C1 accommodates terminal apparatuses M12, M13, M14 and M15. The terminal apparatus M11 as the master terminal has a backhaul link L11, and can exchange a control signaling with various network nodes via the backhaul link L11. When the terminal apparatus M11 processes traffic of the terminal apparatuses M12, M13, M14 and M15, a system capacity as a whole network can be improved.

Figure 3:
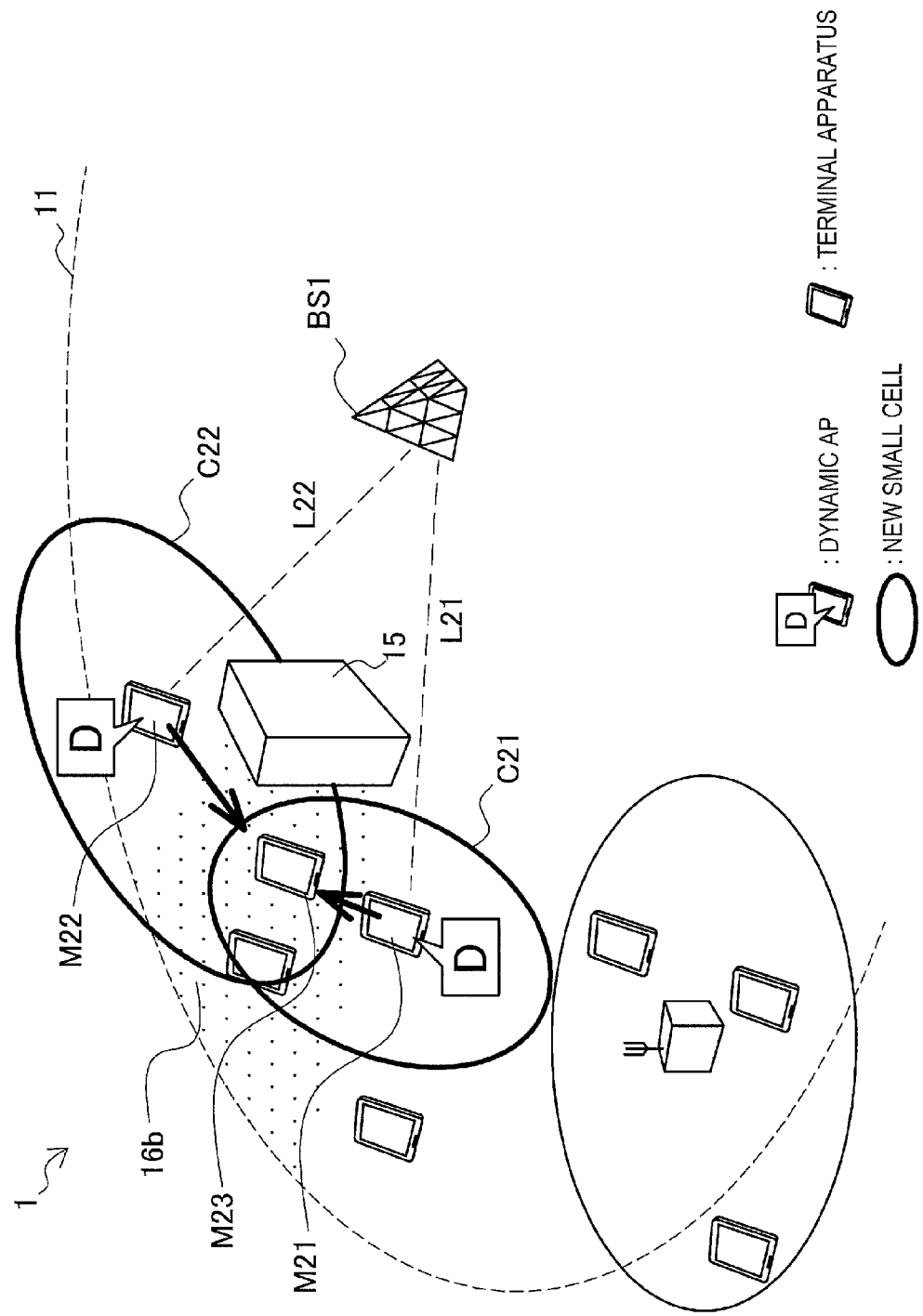
FIG. 3 is a second explanatory diagram for explaining a small cell operable by a dynamic AP.

FIG. 3 is a second explanatory diagram for explaining the small cell operable by the dynamic AP. With reference to FIG. 3, joint transmission as a type of coordinated multi-point (CoMP) transmission technology is being performed toward a terminal apparatus M23 positioned in the region 16b, by terminal apparatuses M21 and M22. The terminal apparatus M21 is a master terminal operating a small cell C21, and has a backhaul link L21. The terminal apparatus M22 is a master terminal operating a small cell C22, and has a backhaul link L22. In this manner, two or more master terminals may be selected for providing a service to a certain terminal. When the terminal apparatuses M21 and M22 relay traffic between the terminal apparatus M23 and the macro cell 11, communication quality experienced by the terminal apparatus M23 can be improved.

[1-3. Explanation of Problems]

The master terminal can be selected from one or more terminal apparatuses having a capability as the dynamic AP. When the master terminal is selected, various conditions such as a position, performance, communication quality, a remaining battery level, and mobility of each dynamic AP may be considered. However, even when the master terminal is selected on any condition, it cannot be expected that the selection of the master terminal (set of master terminals) at a certain point continues to be optimal for the subsequent operation of the small cell. Actually, various events disturbing the operation of the small cell by the selected master terminal may occur.

FIG. 4 is an explanatory diagram for explaining a first example of the event disturbing the operation of the small cell. With reference to FIG. 4, similarly to the example of FIG. 2, the small cell C1 is operated by the terminal apparatus M11. However, in the example of FIG. 4, the small cell C1 further accommodates terminal apparatuses M16, M17 and M18. And, since the amount of traffic transmitted/received by these accommodated terminals is excessive, the terminal apparatus M11 is in an overload state (an event Ev1). The overload of the master terminal may bring obstructions such as delay of traffic or function stop of the master terminal. Therefore, it is desirable that the overload state is prevented.

FIG. 5 is an explanatory diagram for explaining a second example of the event disturbing the operation of the small cell. With reference to FIG. 5, similarly to the example of FIG. 2, the small cell C1 is operated by the terminal apparatus M11. However, in the example of FIG. 5, communication quality of the backhaul link owned by the terminal apparatus M11 is below a predetermined threshold value (an event Ev2). The quality deterioration of the backhaul link of the master terminal may bring obstructions such as a loss of a packet or delay of traffic. Therefore, it is not desirable to continue to use the master terminal having the backhaul link having low communication quality.

FIG. 6 is an explanatory diagram for explaining a third example of the event disturbing the operation of the small cell. With reference to FIG. 6, the terminal apparatus M21 as the master terminal that had operated the small cell C21 in the vicinity of the region 16b in the example of FIG. 3 has been moved away from the region 16b as indicated by the arrow in the figure. As a result, the small cell C21 is no longer detected by the terminal apparatus M23. Such absence of the master terminal (an event Ev3) may occur not only by the movement of the master terminal but by communication inability caused by obstructions of the master terminal (such as hardware failure, software abnormality or battery shortage). The absence of the master terminal makes the small cell unusable and therefore, should be prevented.

Many of the dynamic AP are terminal apparatuses that can be carried by users. These terminal apparatuses are not normally designed to have as high reliability as that of the base station. Therefore, it is difficult to fully avoid the occurrence of the above described events disturbing the operation of the small cell. When the above described events have occurred, if it is necessary to start over again the reconfiguration of the small cell including reselection of the master terminal, the signaling overhead for exchanging information related to the dynamic AP becomes significant, and may cause measurable delay. Accordingly, in the technology according to the present disclosure, a networking control entity (NCE) that selects in advance one or more sub-master terminals as well as the master terminal is introduced. The sub-master terminal selected by the networking control entity promptly becomes involved in the operation of the small cell according to the occurrence of the event. Such an embodiment will be described in detail in the next section.

<2. Configuration of Networking Control Node>

In this specification, a node mounting the networking control entity is called a networking control node. The networking control node may be mounted in any communication node. In terms of accessibility from the terminal, it is advantageous that the networking control node is mounted as one function of the base station, the control node on the core network, or a server on the Internet. In this section, as an example, the networking control node is mounted on the control node (for example, a mobility management entity (MME), a serving gateway (S-GW) or a PDN gateway (P-GW), or a dedicated node for the NCE) on the core network 13.

FIG. 7 is a block diagram illustrating an example of a configuration of a networking control node 100 according to an embodiment. With reference to FIG. 7, the networking control node 100 includes a communication unit 110, a storage unit 120, and a control unit 130.

[2-1. Communication Unit]

The communication unit 110 is a communication interface allowing the networking control node 100 to communicate with other apparatuses. The communication unit 110 communicates with, for example, the various base stations connected to the core network 13 or the Internet 14. Further, the communication unit 110 communicates with the terminal apparatus via these base stations.

[2-2. Storage Unit]

The storage unit 120 stores a program and data for operation of the networking control node 100 by using a storage medium such as a hard disk or a semiconductor memory. The data stored by the storage unit 120 may include dynamic AP information, terminal information and existing cell information, which will be discussed later.

[2-3. Control Unit]

The control unit 130 controls overall operations of the networking control node 100 by using a processor such as a central processing unit (CPU) or a digital signal processor (DSP). In this embodiment, the control unit 130 includes a master selection unit 132, and a small cell control unit 134.

(1) Master Selection Unit

The master selection unit 132 uses dynamic AP-related information collected via the communication unit 110 to select the master terminal operating the small cell, and one or more sub-master terminals. A trigger of the selection of the master terminal and the sub-master terminal may be, for example, reception of a small cell installation request from the macro cell base station for the purpose of improvement in system capacity, or reception of a small cell installation request from the terminal apparatus experiencing poor communication quality for the purpose of improvement in communication quality. Instead, the master selection unit 132 may monitor the system capacity or the communication quality of the individual terminal apparatus to actively determine the need for installing a new small cell.

In this embodiment, the dynamic AP-related information may include the terminal information, the dynamic AP information, and the existing cell information. The terminal information may be acquired from each of the terminal apparatuses within the heterogeneous network 1, or may be acquired from the base station preliminarily holding the terminal information, or other network nodes. The terminal information may include at least one of the information items listed as follows:

a) Terminal identifier
b) Position data
c) Communication history data
d) Capability data
e) Communication quality data
f) Remaining battery level data
g) Mobility data A position of each terminal apparatus may be determined according to any positioning method. For example, any of positioning methods such as assisted-global navigation satellite systems (A-GNSS), an observed time difference of arrival (OTDOA), or an enhanced-cell ID (E-CID), which is supported after the 3GPP Release 9, may be used for determining the position of each terminal apparatus.

The communication history data is data indicating a past communication amount of each terminal apparatus (for example, a transmitting traffic amount and a receiving traffic amount for each fixed period).

The capability data may be a simple graph indicating whether each terminal apparatus can operate as the dynamic AP or not. Instead, the capability data may indicate at least one of processor performance, a memory size, the number of antennas and a terminal class (specified by the 3GPP) of each terminal. In a case of the latter, the small cell control unit 134 can identify, as the dynamic AP, the terminal apparatus in which the capability data satisfies an operation requirement of the dynamic AP.

The communication quality data is data indicating communication quality measured by each terminal apparatus. The communication quality data may indicate at least one of a received signal strength indicator (RSSI), reference signal receiving quality (RSRQ), a bit error rate (BER), a frame error rate (FER), and a signal-to-noise (S/N) ratio. The terminal apparatus that does not have communication quality exceeding a predetermined threshold value may be excluded from master terminal candidates for operating the small cell.

The remaining battery level data is data indicating the latest remaining battery level of each terminal apparatus. The remaining battery level data may include a flag indicating whether each terminal apparatus is connected to an external power supply. The terminal apparatus that is not connected to the external power supply and does not have a remaining battery level exceeding a predetermined threshold value may be excluded from the master terminal candidates for operating the small cell.

The mobility data is data indicating a mobility status of each terminal apparatus. For example, the mobility data may be able to identify two kinds of statuses of "no movement" and "during movement", or may be able to identify more statuses such as "no movement", "during low-speed movement" and "during high-speed movement". The terminal apparatus having a specific mobility status (for example, "during high-speed movement") may be excluded from the master terminal candidates for operating the small cell.

The dynamic AP information may be acquired from each of the terminal apparatuses having capability as the dynamic AP, or may be acquired from the base station or other network nodes. The dynamic AP information may include at least one of the information items listed as follows:
h) User approval flag
i) Maximum transmission power
j) Accommodated terminal upper limit The user approval flag indicates whether or not a user of the dynamic AP has approved that each dynamic AP is used as the master terminal operating the small cell. When the user approval data indicates refuse of the use of a certain dynamic AP as the master terminal, the small cell control unit 134 may exclude the dynamic AP from the master terminal candidates.

The maximum transmission power indicates a maximum value of transmission power that each dynamic AP can output. The maximum transmission power can be used for determining coverage of the small cell when assuming that each dynamic AP operates the small cell.

The accommodated terminal upper limit indicates an upper limit of the number of terminals that can be accommodated in the small cell operated by each dynamic AP.

The existing cell information includes information on the macro cell and the existing small cell. The existing cell information on the macro cell may be acquired from the macro cell base station or other network nodes. The existing cell information on the existing small cell may be acquired from the small cell base station, or the master terminal, the macro cell base station or other network nodes, which operate each cell. The existing cell information may include at least one of the information items listed as follows:
k) Coverage data
l) Allowable interference level
m) Connection terminal list The coverage data is data indicating coverage of each existing cell. The coverage data may include, for example, position coordinates and a cell radius of the base station (or the master terminal) of each existing cell. Instead, the coverage data may include polygon data indicating a more complicated geographical shape of the cell.

The allowable reference level indicates an upper limit of an allowable power level of an interference signal for each existing cell. The allowable interference level may indicate, typically, an allowable power level at the cell edge of each existing cell.

The connection terminal list is a list of a terminal identifier of the terminal apparatus being connected to each existing cell. The small cell control unit 134 can refer to the connection terminal list to identify which of the terminal apparatuses connects to each of the macro cell and the existing small cell.

The master selection unit 132 first uses the acquired terminal information for each terminal apparatus to select one or more master terminal candidates for operating the small cell. For example, the master selection unit 132 identifies the terminal apparatus having capability operable as the access point, that is, the dynamic AP on the basis of the capability data described above. The master selection unit 132 then selects, as the master terminal candidate, the apparatus in which the communication quality between itself and the macro cell, the remaining battery level or the mobility satisfies a predetermined reference, from the identified dynamic APs. For example, the master selection unit 132 may exclude, as described above, the dynamic AP that does not have the communication quality exceeding the predetermined threshold value, the dynamic AP that does not have the remaining battery level exceeding the predetermined value, or the dynamic AP moving at high speed, from the master terminal candidates.

Next, the master selection unit 132 calculates a communication efficiency score indicating communication efficiency assumed when each of the selected master candidates operates the small cell, and selects the master terminal or the sub-master terminal on the basis of the calculated communication efficiency score. The master selection unit 132 sets, for example, coverage of an assumed small cell (hereinafter referred to as an assumed cell) for each master terminal candidate in order to calculate the communication efficiency score. A radius of the coverage of the assumed cell may be simply determined on the basis of an attenuation ratio (as a function of a distance) depending on the maximum transmission power and the channel frequency of each master terminal candidate. Instead, the reduced coverage of the assumed cell may be set by using transmission power reduced based on the coverage and the allowable interference level of the existing cell so as to prevent harmful interference to the existing cell.

In the first example, a communication efficiency score $S_1$ is calculated in terms of a system capacity according to Formula (1) as follows:

[Math 1]

$$S_1 = w_1 \cdot N_{UE} + w_2 \cdot \sum_{i=1}^{N_{UE}} Tf(UE_i) + w_3 \cdot Co \quad (1)$$

$N_{UE}$ of the first term of the right side of Formula (1) represents an accommodated terminal count, and the accommodated terminal count equals to the number of the terminal apparatuses positioned within the coverage of the assumed cell. Note that, when the number of the terminal apparatuses positioned within the coverage exceeds an accommodated terminal upper limit of the cell, the accommodated terminal upper limit can be treated as the accommodated terminal count $N_{UE}$, instead of the number of the terminal apparatuses positioned within the coverage. $Tf(UE_i)$ of the second term represents a traffic amount of the i-th accommodated terminal of the assumed cell. The sum of the traffic amounts of $N_{UE}$ accommodated terminals of the assumed cell is referred to as an accommodated terminal communication amount in this specification. As the traffic amount $Tf(UE_i)$ of the i-th accommodated terminal, for example, a past communication amount indicated by communication history data of an accommodated terminal $UE_i$ may be used, or a predicted value from the past communication amount may be used. Co of the third term represents a size of the coverage of the assumed cell (for example, a radius or an area of the coverage). Variables w1, w2 and w3 multiplied by the respective terms of the right side of Formula (1) are weights that can be tuned in terms of optimization of the communication efficiency, and some weights may be zero.

In the second example, a communication efficiency score $S_2$ is calculated in terms of communication quality of the accommodated terminal according to Formula (2) as follows:

[Math 2]

$$S_2 = \sum_{i=1}^{N_{UE}} \frac{1}{RSSI(UE_i)} \quad (2)$$

$RSSI(UE_i)$ of the right side of Formula (2) represents reception signal intensity of the i-th accommodated terminal of the assumed cell. The reception signal intensity herein is a value measured for a downlink signal of the macro cell. The communication efficiency score $S_2$ equals to the sum of the inverse of the reception signal intensity of the accommodated terminal, and the more the terminal having low reception signal intensity is included in the assumed cell, the higher the communication efficiency score $S_2$ is. That is, the high value of the communication efficiency score $S_2$ means that significant improvement in communication quality can be expected as a whole by installing the small cell in that place. Note that, instead of the communication efficiency score, other kinds of quality indexes such as RSRQ, BER, FER or a SN ratio may be used.

Figure 8A:
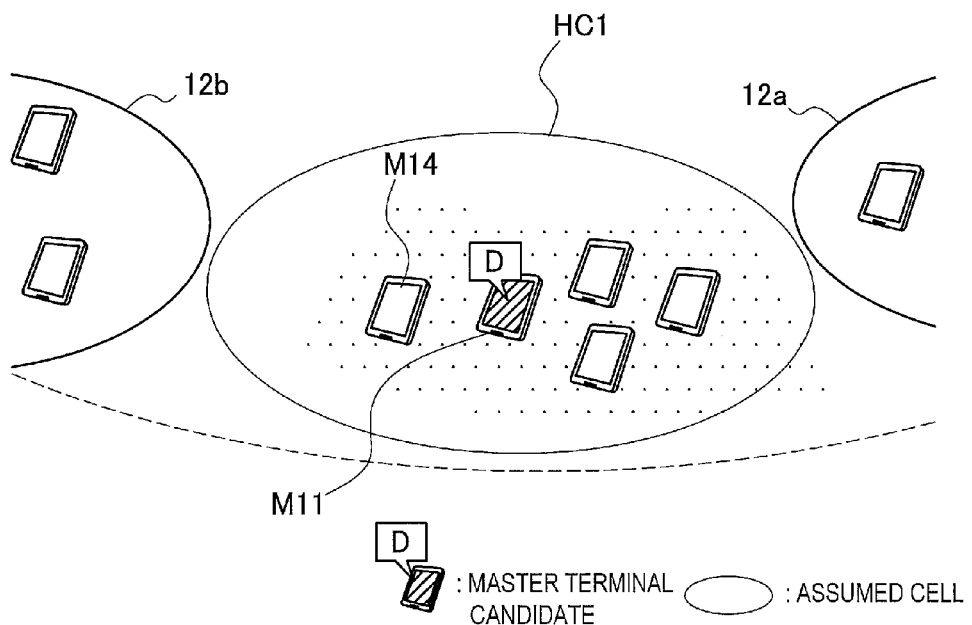
FIG. 8A is an explanatory diagram illustrating an example of coverage of an assumed cell for a certain master terminal candidate.
Figure 8B:
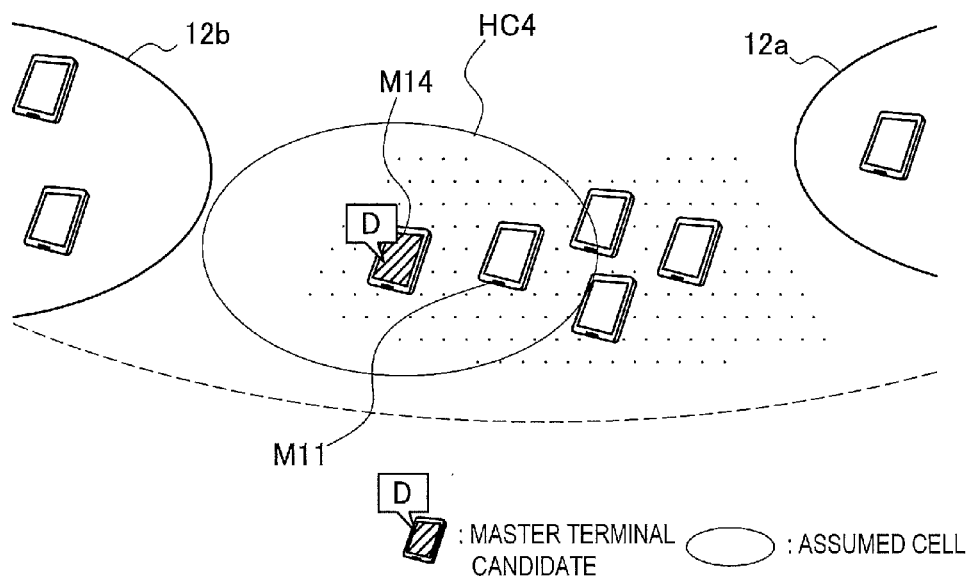
FIG. 8B is an explanatory diagram illustrating an example of coverage of an assumed cell for another master terminal candidate.

FIG. 8A and FIG. 8B illustrate an example of the coverage of the assumed cell for two master terminal candidates. With reference to FIG. 8A, the terminal apparatus M11 is selected as the master terminal candidate. An assumed cell HC1 is set for the terminal apparatus M11. The coverage of the assumed cell HC1 is determined so as to prevent harmful interference to the existing cells 12a and 12b. The assumed cell HC1 includes four terminal apparatuses within the coverage. On the other hand, with reference to FIG. 8B, the terminal apparatus M14 is selected as the master terminal candidate. An assumed cell HC4 is set for the terminal apparatus M14. The coverage of the assumed cell HC4 is determined so as to prevent harmful interference to the existing cells 12b. The assumed cell HC4 includes one terminal apparatus within the coverage. As described above, since which of the terminal apparatuses are included in the coverage of the assumed cell is different for each master terminal candidate, for example, the value of the communication efficiency score that can be calculated according to Formula (1) or Formula (2) is also different for each master terminal candidate.

FIG. 9A is an explanatory diagram for explaining an example of selection of the master terminal and the sub-master terminal based on the communication efficiency score. With reference to FIG. 9A, an example of the scoring result of the communication efficiency scores for the terminal apparatuses M11, M12, M13, M14 and M15 is shown in a table form. According to the second column of the table, the terminal apparatuses M11, M12, M13 and M14 among these terminal apparatuses are selected as the master terminal candidates. The terminal apparatus M15 is excluded from the master terminal candidates due to the shortage of the capability, the shortage of the communication quality, the shortage of the remaining battery level or the high mobility, as the dynamic AP. In the third column of the table, while the accommodated terminal count of the master terminal candidates M11, M12 and M13 is four, the accommodated terminal count of the master terminal candidate M14 is one. In the fourth column in the table, the coverage of the master terminal candidate M11 is largest, and the coverage of the master terminal candidate M14 is smallest, and the coverage of the master terminal candidates M12 and M13 is at the midpoint of them. The master selection unit 132 calculates communication efficiency scores $S_1(M11)$, $S_1(M12)$, $S_1(M13)$ and $S_1(M14)$ for the master terminal candidates M11, M12, M13 and M14, respectively, by using these parameters, for example, according to Formula (1) described above. In the example of FIG. 9A, among these communication efficiency scores, the communication efficiency scores $S_1(M11)$ is highest, and the communication efficiency score $S_1(M12)$ and the communication efficiency score $S_1(M13)$ are second highest and third highest, respectively. Here, the number X of the master terminals to be selected as an example equals to 1, and the number Y of the master terminals to be selected equals to 2. In this case, the master selection unit 132 selects the master terminal candidate M11 indicating the highest communication efficiency score as the master terminal. Further, the master selection unit 132 selects the two master terminal candidates M12 and M13 indicating the next highest communication efficiency score as the sub-master terminal.

Note that the master selection unit 132, when the small cell is operated to improve communication quality for a specific terminal, may select the master terminal candidate satisfying a condition that a current position of the specific terminal can be included in the coverage of the assumed cell (hereinafter referred to as a specific condition), as the master terminal or the sub-master terminal.

FIG. 9B is an explanatory diagram for explaining another example of selection of the master terminal and the sub-master terminal based on the communication efficiency score. With reference to FIG. 9B, an example of the scoring result of the communication efficiency scores of the terminal apparatuses M11, M12, M13, M14 and M15 is shown in a table form. Similarly to FIG. 9A, according to the second column of the table, the terminal apparatuses M11, M12, M13 and M14 of these terminal apparatuses are selected as the master terminal candidates. Further, according to the third column in the table, while the master terminal candidates M11, M12 and M13 satisfy the specific condition, the master terminal candidate M14 does not satisfy the specific condition. Therefore, the master selection unit 132 does not calculate the communication efficiency score for the master terminal candidate M14, and does not select the master terminal candidate M14 as the master terminal or the sub-master terminal. Accordingly, the operation of the small cell for the specific terminal can ensure the improvement in communication quality. In the fourth column of the table, the communication quality experienced by the accommodated terminal of the assumed cell as the master terminal candidate M1 is low compared with the other master terminal candidates. The master selection unit 132 calculates communication efficiency scores $S_2(M11)$, $S_2(M12)$ and $S_2(M13)$ for the master terminal candidates M11, M12 and M13, respectively, by using these parameters, for example, according to Formula (2) described above. In the example of FIG. 9B, among these communication efficiency scores, the communication efficiency scores $S_2(M11)$ is highest. Then, when X=1 and Y=2 are satisfied similarly to the example of FIG. 9A, the master selection unit 132 selects the master terminal candidate M11 indicating the highest communication efficiency score as the master terminal. Further, the master selection unit 132 selects the two master terminal candidates M12 and M13 indicating the next highest communication efficiency score as the sub-master terminal.

(2) Small Cell Control Unit

The small cell control unit 134 controls the operation of the small cell by the dynamic AP. For example, the small cell control 134, when a certain dynamic AP is selected as the master terminal by the master selection unit 132, instructs the operation of the small cell to the dynamic AP. When a plurality of master terminals are selected by the master selection unit 132, the small cell control unit 134 instructs the plurality of master terminals to operate the small cell by using cooperative transmission technology. Further, the small cell control unit 134 may notice the master terminal of a value of transmission power to be reduced so as to prevent harmful interference to the existing cell. Further, the small cell control unit 134, when a certain dynamic AP is selected as the master terminal by the master selection unit 132, notices the dynamic AP of being selected as the sub-master terminal. Then, the small cell control unit 134 instructs involvement to the operation of the small cell to at least one sub-master terminal according to the occurrence of the event disturbing the operation of the small cell by the master terminal. The identification information of the terminal apparatus selected as the master terminal and the sub-master terminal can be also provided to the macro cell base station.

(2-1) Overload of Master Terminal

For example, the master terminal or the macro cell base station operating the small cell transmits a load index indicating a load of the master terminal to the networking control node 100. The load index may be periodically transmitted, or may be transmitted when the load index exceeds a predetermined threshold value. The small cell control unit 134 monitors the load index to determine the execution of load distribution according to the occurrence of the overload event Ev1 indicating an increase in load of the master terminal. The small cell control unit 134, when the overload event Ev1 occurs, selects at least one provisional master terminal to be involved in the load distribution from one or more sub-master terminals. For example, the small cell control unit 134 can select the provisional master terminal on the basis of various parameters such as the position, the communication quality, the remaining battery level, the mobility, the maximum transmission power and the accommodated terminal upper limit of each of the sub-master terminals. The small cell control unit 134 may further select a load distribution system. Examples of the candidates of the load distribution system that can be selected by the small cell control unit 134 may include a space division system, and a resource division system. In the space division system, the master terminal and the provisional master terminal can simultaneously communicate with different terminal apparatuses by using the same frequency channel when the master terminal and the provisional master terminal direct antenna beams to different sectors, respectively. The resource division system is a system in which different resources in a frequency domain or a time domain or both are allocated to the master terminal and the provisional master terminal, respectively. The small cell control unit 134 may dynamically select the load distribution system on the basis of the position or the capability of the master terminal and the provisional master terminal. The small cell control unit 134 then allows the provisional master terminal to process a part of the traffic that has been processed by the master terminal. When the load distribution system is dynamically selected, the small cell control unit 134 also instructs the load distribution system to the master terminal and the provisional master terminal.

Figure 10A:
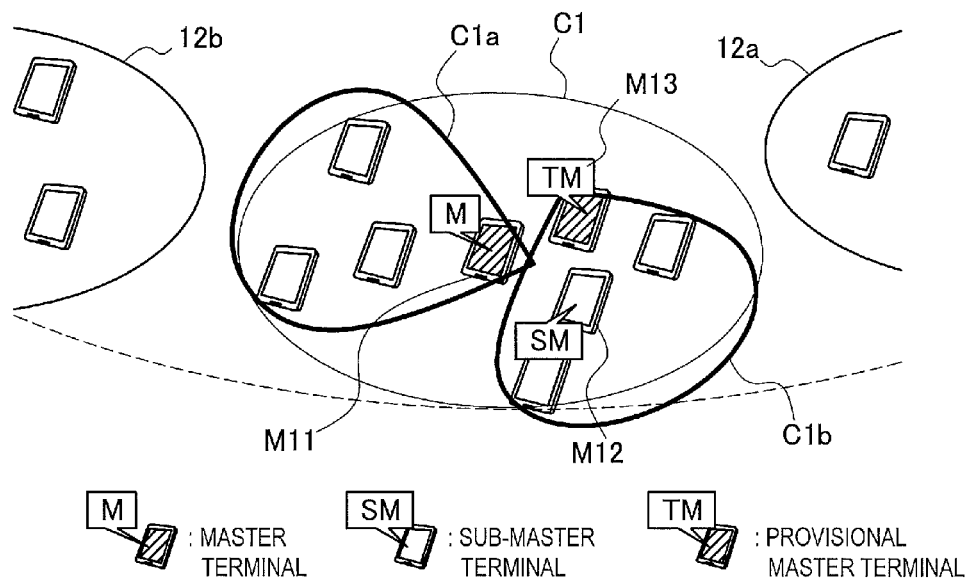
FIG. 10A is an explanatory diagram for explaining an example of load distribution by the master terminal and a provisional master terminal.

FIG. 10A is an explanatory diagram for explaining an example of the load distribution by the master terminal and the provisional master terminal. With reference to FIG. 10A, the terminal apparatuses M11, M12 and M13 are shown. The terminal apparatus M11 is the master terminal, and the terminal apparatuses M12 and M13 are the sub-master terminals. Here, assume that, while the master terminal M11 is operating the small cell C1, the load of the master terminal M11 has been increased to increase the possibility that the master terminal M11 falls into an overload state. The small cell control unit 134 determines the overload event Ev1 from the load index for the master terminal M11 to select the sub-master terminal M13 as the provisional master terminal, and then determines the load distribution using the space division system to instruct the load distribution to the master terminal M11 and the provisional master terminal M13. In the example of FIG. 10A, while the master terminal M11 forms an antenna beam C1a, the provisional master terminal M13 forms an antenna beam C1b. As a result, the master terminal M11 and the provisional master terminal M13 become possible to process the increasing traffic in the small cell C1 in a distributed manner to avoid a risk of the overload of the master terminal M11.

Figure 10B:
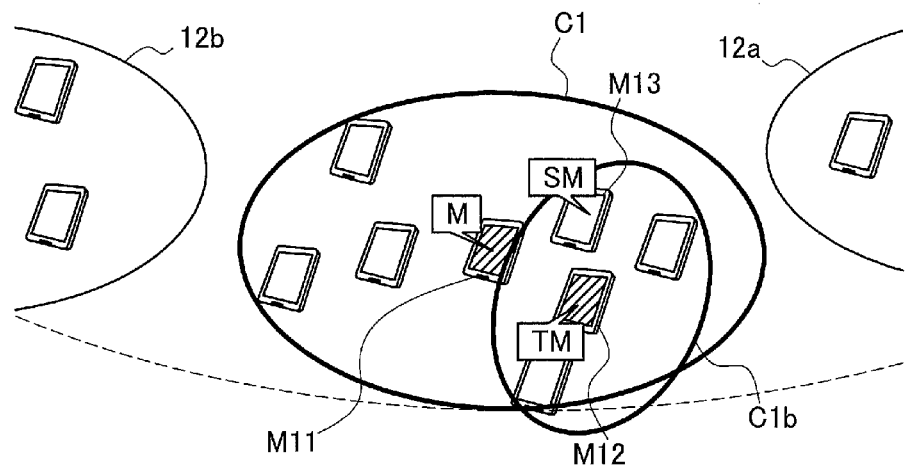
FIG. 10B is an explanatory diagram for explaining another example of load distribution by the master terminal and the provisional master terminal.

FIG. 10B is an explanatory diagram for explaining an example of the load distribution by the master terminal and the provisional master terminal. With reference to FIG. 10B, the terminal apparatuses M11, M12 and M13 are shown again. The terminal apparatus M11 is the master terminal, and the terminal apparatuses M12 and M13 are the sub-master terminals. Here, assume that, while the master terminal M11 is operating the small cell C1, the load of the master terminal M11 has been increased to increase the possibility that the master terminal M1 falls into an overload state. The small cell control unit 134 determines the overload event Ev1 from the load index for the master terminal M11 to select the sub-master terminal M12 as the provisional master terminal, and then determines the load distribution using the resource division system to instruct the load distribution to the master terminal M11 and the provisional master terminal M12. In the example of FIG. 10B, while a frequency resource F1 is allocated to the master terminal M11, a frequency resource F1b different from the frequency resource F1 is allocated to the provisional master terminal M12. The provisional master terminal M12 uses the allocated frequency resource F1b to operate a small cell C1b. As a result, the master terminal M11 and the provisional master terminal M12 become possible to process the increasing traffic in the small cell C1 in a distributed manner to avoid a risk of the overload of the master terminal M11.

While the load distribution is executed, the master terminal and the provisional master terminal or the macro cell base station may transmit the load index indicating the load of the master terminal and the provisional master terminal to the networking control node 100. The load index may be periodically transmitted or may be transmitted when the load index is below a predetermined threshold value. The small cell control unit 134 may monitor the load index to determine the end of the load distribution when it is determined that the traffic amount to be processed has been reduced.

Note that the method of the load distribution described above may be applied not only to the small cell operated by the dynamic AP but to the small cell operated by the small cell base station. In this case, the networking control node 100 selects one or more sub-master terminals in relation to each small cell base station. The networking control node 100 then allows at least one sub-master terminal to process a part of the traffic that has been processed by the small cell base station according to an increase in load of the small cell base station.

(2-2) Quality Deterioration of Backhaul Link

Further, for example, the master terminal or the macro cell base station operating the small cell transmits the quality index indicating the communication quality of the backhaul link of the master terminal to the networking control node 100. The quality index may be periodically transmitted or may be transmitted when the quality index is below the predetermined threshold value. The small cell control unit 134 monitors the quality index to determine the switching of the master terminal (allowing the sub-master terminal to substitute in the operation of the small cell) when it is determined that the backhaul link quality deterioration event Ev2 has occurred. The small cell control unit 134 then selects at least one provisional master terminal to be involved in the operation of the small cell from the one or more sub-master terminals. Note that the quality index of the backhaul link for each of the sub-master terminals is also periodically transmitted to the networking control node 100. Accordingly, the small cell control unit 134 can select the sub-master terminal having successful communication quality between itself and the macro cell base station, as the provisional master terminal. The small cell control unit 134 then instructs the selected provisional master terminal to substitute in the operation of the small cell. Further, the small cell control unit 134 instructs the master terminal to stop the operation of the small cell.

Figure 11:
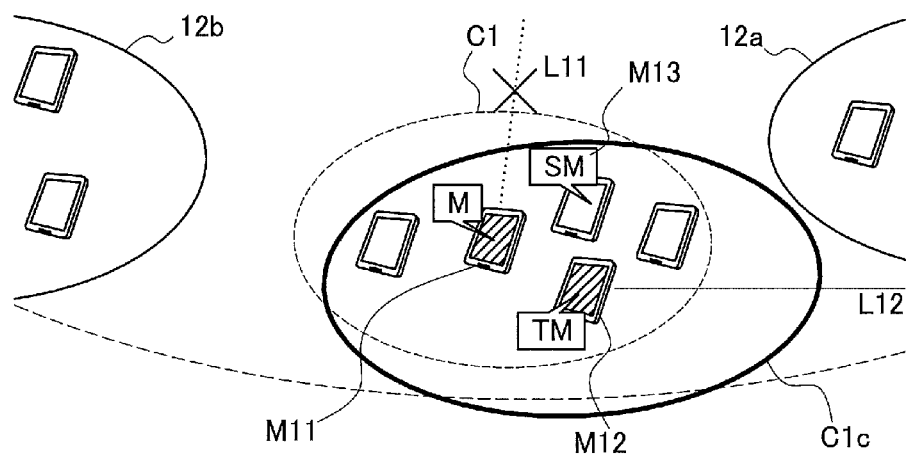
FIG. 11 is an explanatory diagram for explaining substitution of an operation of the small cell by the provisional master terminal.

FIG. 11 is an explanatory diagram for explaining the substitution of the operation of the small cell by the provisional master terminal. With reference to FIG. 11, the terminal apparatuses M11, M12 and M13 are shown. The terminal apparatus M11 is the master terminal, and the terminal apparatuses M12 and M13 are the sub-master terminals. Here, assume that, while the master terminal M11 is operating the small cell C1, the communication quality of a backhaul link L11 of the master terminal M11 has been deteriorated. The small cell control unit 134 determines the backhaul link quality deterioration event Ev2 from the quality index for the backhaul link L11 of the master terminal M11. The small cell control unit 134 then compares the communication quality between the sub-master terminals M12 and M13 to select, for example, the sub-master terminal M12 as the provisional master terminal. In the example of FIG. 11, the provisional master terminal M12 starts operating a small cell C1c by using a backhaul link L12. Further, the master terminal M11 stops the operation of the small cell C1. The terminal apparatus connected to the small cell C1 can continue the communication by handing it over to the small cell C1c operated by the provisional master terminal M12.

During the substitution of the operation of the small cell, the master terminal and the provisional master terminal or the macro cell base station may transmit the quality index for the backhaul link of the master terminal and the provisional master terminal to the networking control node 100. The small cell control unit 134, when it is determined from the quality index that the communication quality of the backhaul link of the master terminal has been recovered, may determine the end of the substitution of the operation of the small cell by the provisional master terminal.

Note that, when a plurality of master terminals exist, the small cell control unit 134 may allow these master terminals to use the backhaul link indicating the best communication quality among the backhaul links of the plurality of master terminals, for communication with the macro cell base station (or the core network).

(2-3) Absence of Master Terminal

The absence of the master terminal can be detected by the macro cell base station that had been connected to the master terminal or the terminal apparatus (slave terminal) that had been connected to the master terminal. The small cell control unit 134 can determine the occurrence of the master absence event Ev3 by receiving a master absence notification from the macro cell base station or the slave terminal that has detected the absence of the master terminal. Instead, the small cell control unit 134 may determine the occurrence of the master absence event Ev3 by monitoring position data of the master terminal or performing polling to the master terminal. The small cell control unit 134 determines the switching of the master terminal (allowing the sub-master terminal to newly operate the small cell) according to the occurrence of the master absence event Ev3. The small cell control unit 134, when the master absence event Ev3 has occurred, selects the sub-master terminal that should newly become the master terminal, from the one or more sub-master terminals. For example, the small cell control unit 134 may select the sub-master terminal that should newly become the master terminal, on the basis of various parameters such as the position, the communication quality, the remaining battery level, the mobility, the maximum transmission power and the accommodated terminal upper limit of each of the sub-master terminals. The small cell control unit 134 then instructs the selected sub-master terminal to operate the small cell as the new master terminal.

Figure 12:
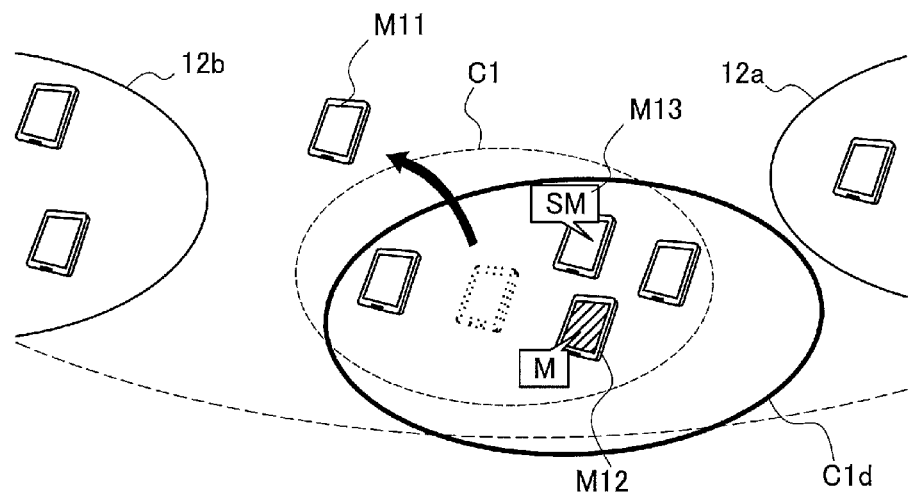
FIG. 12 is an explanatory diagram for explaining an operation of the small cell by a new master terminal selected from the sub-master terminals.

FIG. 12 is an explanatory diagram for explaining the operation of the small cell by the new master terminal selected from the sub-master terminals. With reference to FIG. 12, the terminal apparatuses M11, M12 and M13 are shown. The terminal apparatus M11 that has operated the small cell C1 as the master terminal, has come not to be recognized from the other terminal apparatuses as a result of the movement in the arrow direction in the figure. The terminal apparatuses M12 and M13 are the sub-master terminals. Here, the small cell control unit 134, when receiving a master absence notification, selects the new master terminal from the sub-master terminals M12 and M13. In the example of FIG. 12, the sub-master terminal M12 is selected as the new master terminal to start operating a small cell C1d. The terminal apparatus that has been connected to the small cell C1 can continue the communication by handing it over to the small cell C1d operated by the new master terminal M12.

Note that, instead of the small cell control unit 134 instructing the sub-master terminal to operate the new small cell, the macro cell base station that has detected the absence of the master terminal may instruct the sub-master terminal to operate the small cell. Further, the slave terminal that has detected the absence of the master terminal, when being able to be connected to the sub-master terminal by searching for the sub-master terminal, may request the start of the operation of the small cell to the sub-master terminal.

The master selection unit 132 may execute reselection of at least one of the master terminal and the sub-master terminal according to the occurrence of the master absence event Ev3. Accordingly, it is possible to replenish the number of the reduced master terminals or sub-master terminals to make preparation for the subsequent event disturbing the operation of the small cell. Instead, the master selection unit 132 may execute the reselection of at least one of the master terminal and the sub-master terminal periodically or according to the reduction in the number of the master terminals or the sub-master terminals.

<3. Flow of Processing>

[3-1. Overall Flow]

Figure 13:
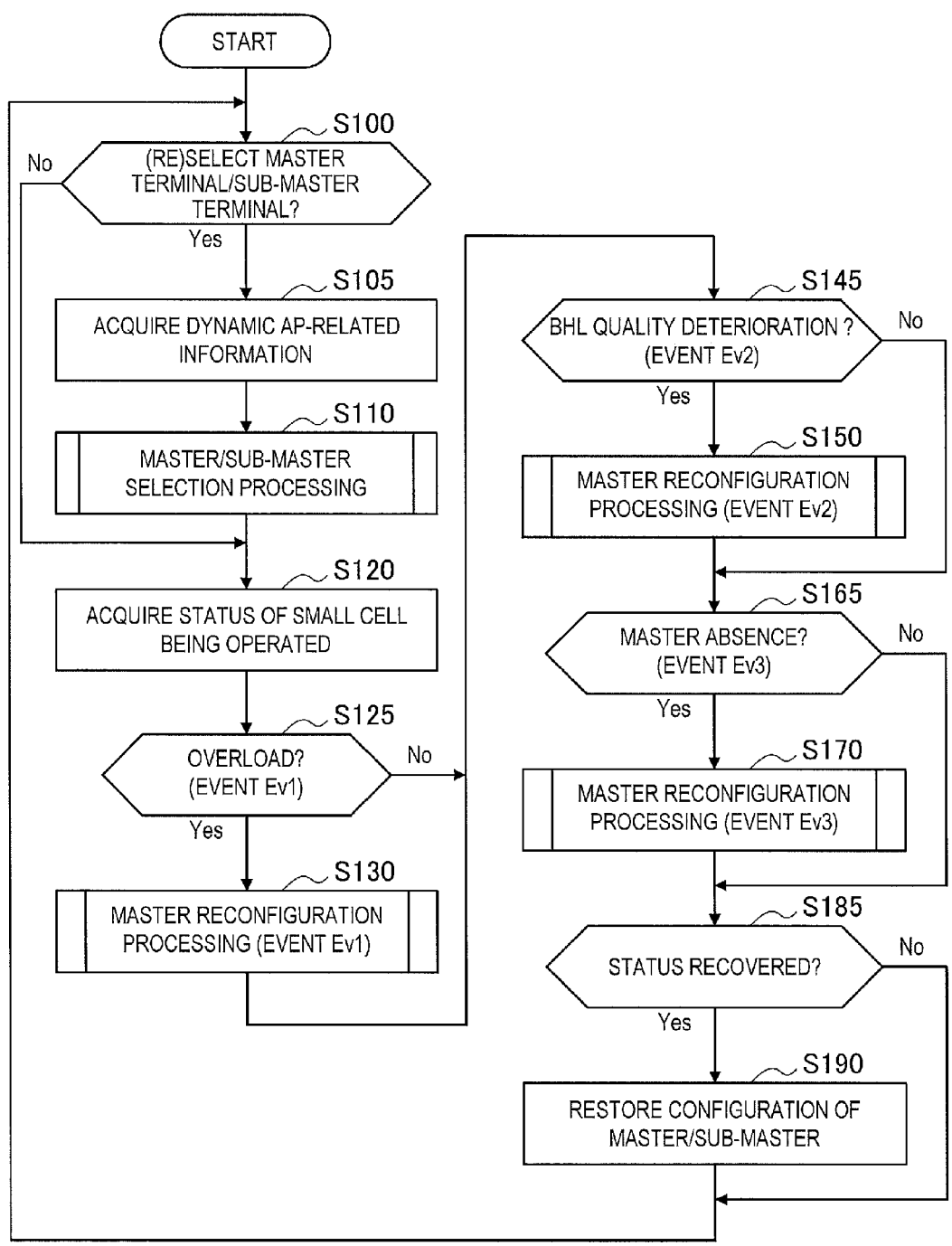
FIG. 13 is a flow chart illustrating an example of an overall flow of communication control processing according to an embodiment.

FIG. 13 is a flow chart illustrating an example of an overall flow of the communication control processing according to the present embodiment.

With reference to FIG. 13, first, the master selection unit 132 determines whether to execute the selection (reselection) of the master terminal and the sub-master terminal (Step S100). For example, the master selection unit 132, when the system capacity of the macro cell is tight, when the communication quality reported from the terminal apparatus is poor, or when the number of the master terminals or the sub-master terminals once selected is reduced, can determine that the selection (reselection) of the master terminal and the sub-master terminal should be executed. The master selection unit 132, when determining that the selection (reselection) of the master terminal and the sub-master terminal should be executed, acquires the dynamic AP-related information via the communication unit 110 (Step S105). The dynamic AP-related information may include the terminal information, the dynamic AP information and the existing cell information described above. Then, the master selection unit 132 executes master/sub-master selection processing by using the acquired dynamic AP information (Step S110). As a result, the one or more master terminals and the one or more sub-master terminals are selected. Further, the operation of the small cell can be started by the master terminal newly selected. There will be further described below a more detailed flow of the master/sub-master selection processing.

The small cell control unit 134 acquires a status of the small cell being operated via the communication unit 110 (Step S120). The status of the small cell acquired here may include the load index for the master terminal, the quality index for the backhaul link of the master terminal and the backhaul link of the sub-master terminal, and the master absence notification. These statues are used to determine the event disturbing the operation of the small cell.

For example, the small cell control unit 134 compares the load level indicated by the load index for the master terminal with the threshold value to determine the occurrence of the overload event Ev1 (Step S125). Here, when it is determined that the overload has occurred, the small cell control unit 134 executes master reconfiguration processing corresponding to the overload event Ev1 (Step S130). As a result, the load distribution involving the sub-master terminal selected as the provisional master terminal is started. There will be further described below a more detailed flow of the master reconfiguration processing.

Further, the small cell control unit 134 compares the quality level indicated by the quality index for the backhaul link of the master terminal with the threshold value to determine the occurrence of the backhaul link (BHL) quality deterioration event Ev2 (Step S145). Here, when it is determined that the backhaul link quality deterioration event Ev2 has occurred, the small cell control unit 134 executes the master reconfiguration processing corresponding to the backhaul link quality deterioration event Ev2 (Step S150). As a result, the substitution of the operation of the small cell by the sub-master terminal selected as the provisional master terminal is started. There will be further described below a more detailed flow of the master reconfiguration processing herein.

Further, the small cell control unit 134 monitors the reception of the master absence notification or monitors the position data of the master terminal to determine the occurrence of the master absence event Ev3 (Step S165). Here, when it is determined that the master absence event Ev3 has occurred, the small cell control unit 134 executes the master reconfiguration processing corresponding to the master absence event Ev3 (Step S170). As a result, the operation of the small cell by the sub-master terminal selected as the new master terminal is started. There will be further described below a more detailed flow of the master reconfiguration processing herein.

Next, the small cell control unit 134 determines whether or not the status of the small cell has recovered (Step S185). For example, the small cell control unit 134, when it is determined that the traffic amount to be processed has decreased after the overload event Ev1, may determine that the status of the small cell has recovered. Further, the small cell control unit 134, when it is determined that the communication quality of the backhaul link of the master terminal exceeds the predetermined threshold value after the backhaul link quality deterioration event Ev2, may determine that the status of the small cell has recovered. When it is determined that the status of the small cell has recovered, the small cell control unit 134 restores the configuration of the master terminal and the sub-master terminal (Step S190). Accordingly, the load distribution by the master terminal and the provisional master terminal, or the substitution of the operation of the small cell by the provisional master terminal can finish.

After that, the processing returns to Step S100, and the above-described processing can be repeated.

[3-2. Master/Sub-Master Selection Processing]

Figure 14:
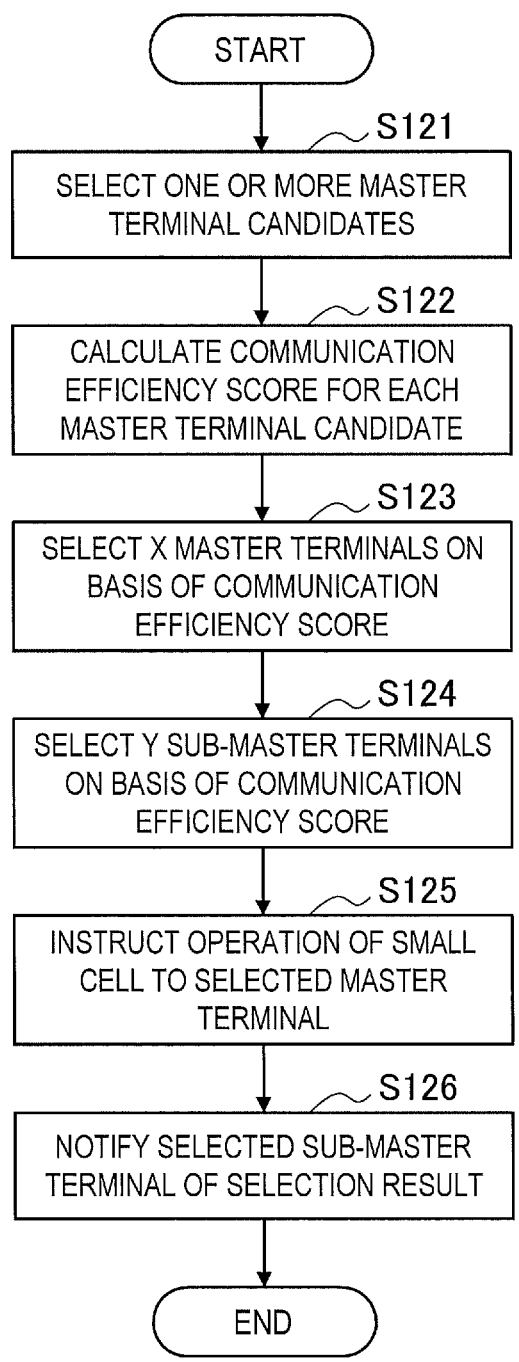
FIG. 14 is a flow chart illustrating an example of a detailed flow of the master/sub-master selection processing of FIG. 13.

FIG. 14 is a flow chart illustrating an example of a detailed flow of the master/sub-master selection processing of FIG. 13.

With reference to FIG. 14, first, the master selection unit 132 uses the acquired terminal information for each terminal apparatus to select the one or more master terminal candidates for operating the small cell (Step S121). The master terminal candidate selected here may be, for example, the apparatus in which the communication quality, the remaining battery level or the mobility satisfies the predetermined reference, among the dynamic APs having the capability operable as the access point.

Next, the master selection unit 132 calculates the communication efficiency score for each of the selected master terminal candidates (Step S122). The communication efficiency score calculated here may be the score calculated in terms of the system capacity, or the score calculated in terms of the communication quality of the accommodated terminal.

Next, the master selection unit 132 selects the top X (X is an integer of 1 or more) master terminals indicating the highest communication efficiency score (Step S123). Further, the master selection unit 132 selects the top Y (Y is an integer of 1 or more) sub-master terminals indicating the next highest communication efficiency score (Step S124).

Then, the small cell control unit 134 instructs the operation of the small cell to the dynamic AP selected as the master terminal by the master selection unit 132 (Step S125). The dynamic AP selected as the master terminal starts the operation of the small cell according to the instruction. Further, the small cell control unit 134 notifies the dynamic AP selected as the sub-master terminal by the master selection unit 132 of being selected as the sub-master terminal (Step S126).

[3-3. Involvement of Sub-Master Terminal]

(1) Overload Event

Figure 15:
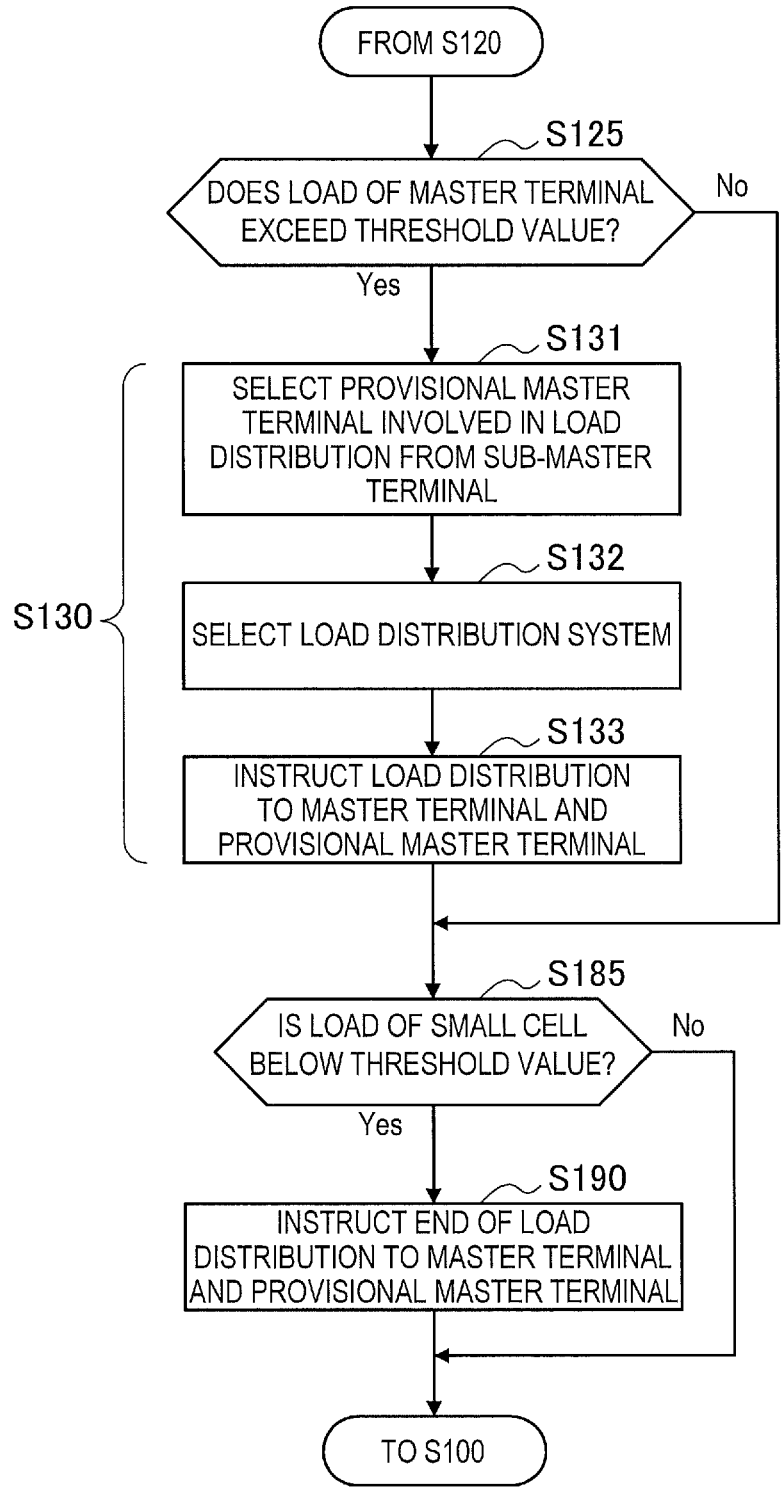
FIG. 15 is a flow chart illustrating an example of a detailed flow of processing related to an overload event.

FIG. 15 is a flow chart illustrating an example of a detailed flow of the processing related to the overload event. The processing here can be executed for each of the small cells managed by the networking control node 100.

With reference to FIG. 15, first, the small cell control unit 134 determines whether the load level indicated by the load index for the master terminal operating the small cell exceeds the threshold value (Step S125). When the load level exceeds the threshold value, the processing proceeds to Step S131. On the other hand, when the load level is below the threshold value, the processing from Step S131 to Step S133 can be skipped.

The processing from Step S131 to Step S133 corresponds to the master reconfiguration processing corresponding to the overload event Ev1 at Step S130 of FIG. 13. First, the small cell control unit 134 selects at least one provisional master terminal allowing the load distribution to be involved, from the sub-master terminals already selected by the master selection unit 132 (Step S131). Further, the small cell control unit 134 selects the load distribution system (Step S132). Then, the small cell control unit 134 instructs the load distribution to the master terminal and the provisional master terminal (Step S133). The instruction of the load distribution here may include the designation of the selected load distribution system.

After that, the small cell control unit 134 monitors the load level that can be periodically reported for the master terminal and the provisional master terminal (Step S185). Then, the small cell control unit 134, when it is determined that the load level of the small cell (for example, the total of the load levels of the master terminal and the provisional master terminal) is below the threshold value, instructs the end of the load distribution to the master terminal and the provisional master terminal (Step S190). Note that the threshold value for determining the end of the load distribution at Step S185 may equal to the threshold value for determining the start of the load distribution at Step S125, or may be different from it.

(2) Backhaul Link Quality Deterioration Event

Figure 16:
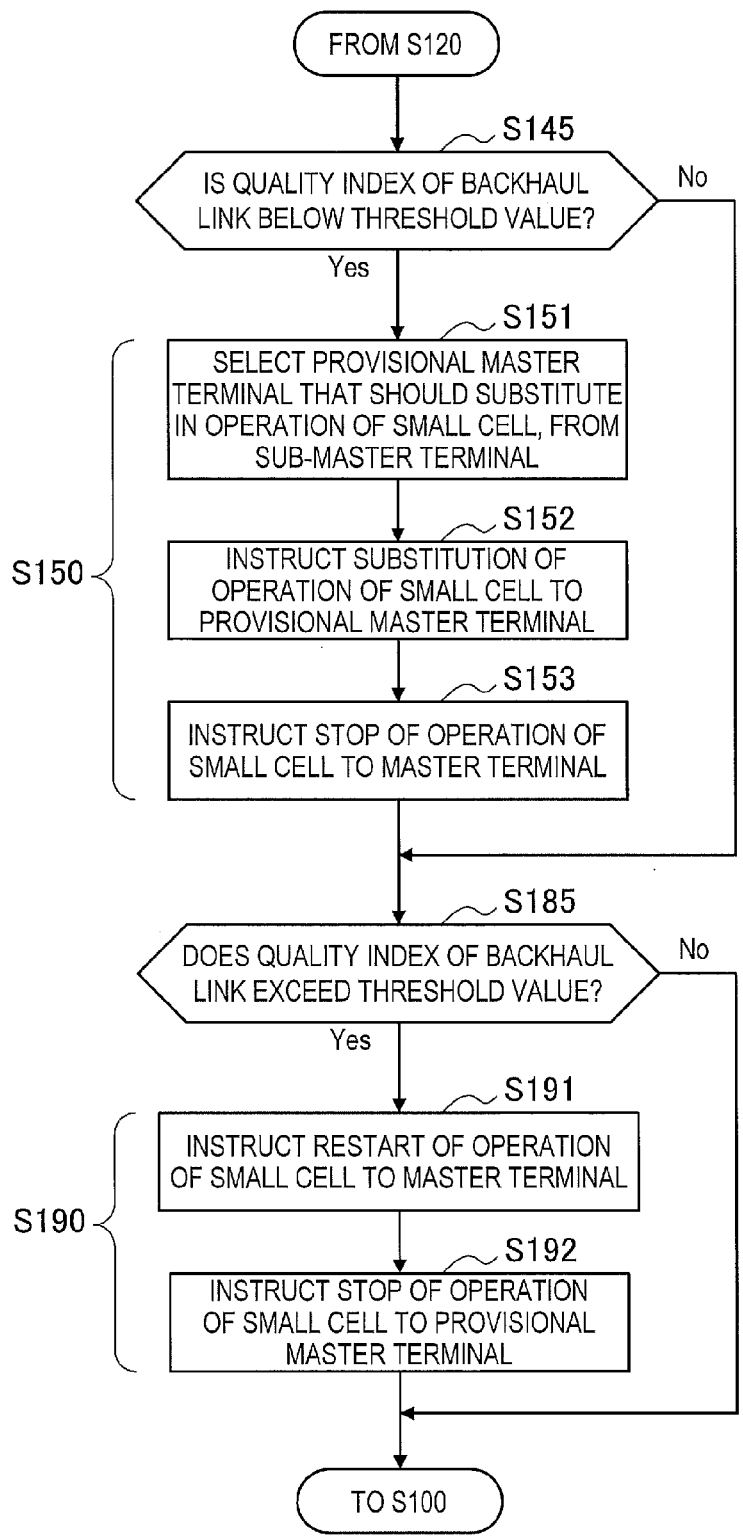
FIG. 16 is a flow chart illustrating an example of a detailed flow of processing related to a backhaul link quality deterioration event.

FIG. 16 is a flow chart illustrating an example of a detailed flow of the processing related to the backhaul link quality deterioration event. The processing here can be executed for each of the small cells managed by the networking control node 100.

With reference to FIG. 16, first, the small cell control unit 134 determines whether the quality level indicated by the quality index for the backhaul link of the master terminal operating the small cell is below the threshold value (step S145). When the quality level is below the threshold value, the processing proceeds to Step S151. On the other hand, when the quality level exceeds the threshold value, the processing from Step S151 to Step S153 can be skipped.

The processing from Step S151 to Step S153 corresponds to the master reconfiguration processing corresponding to the backhaul link quality deterioration Ev2 at Step S150 of FIG. 13. First, the small cell control unit 134 selects at least one provisional master terminal that should substitute in the operation of the small cell, from the sub-master terminals already selected by the master selection unit 132 (Step S151). Then, the small cell control unit 134 instructs the substitution of the operation of the small cell to the selected provisional master terminal (Step S152). Further, the small cell control unit 134 instructs the stop of the operation of the small cell to the master terminal (Step S153).

After that, the small cell control unit 134 monitors the quality level that can be periodically reported for the backhaul link of the master terminal (Step S185). Then, the small cell control unit 134, when it is determined that the quality level for the backhaul link of the master terminal exceeds the threshold value, ends the substitution of the operation of the small cell by the provisional master terminal. That is, the small cell control unit 134 instructs the restart of the operation of the small cell to the master terminal (Step S191), and instructs the stop of the operation of the small cell to the provisional master terminal (Step S192). Note that the threshold value compared with the quality level at Step S185 may equal to the threshold value used at Step S145 or may be different from it.

(3) Master Absence Event

Figure 17A:
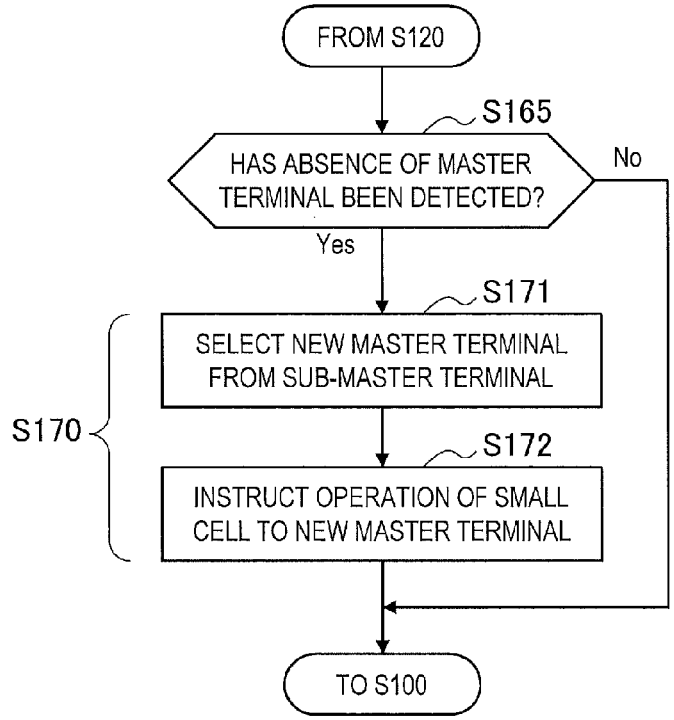
FIG. 17A is a flow chart illustrating an example of a detailed flow of processing in a networking control node related to a master absence event.

FIG. 17A is a flow chart illustrating an example of a detailed flow of the processing in the networking control node related to the master absence event. The processing here can be executed for each of the small cells managed by the networking control node 100.

With reference to FIG. 17A, first, the small cell control unit 134 determines whether the absence of the master terminal operating the small cell has been detected (Step S165). When the absence of the master terminal has been detected, the processing proceeds to Step S171. On the other hand, when the absence of the master terminal has not been detected, the processing of Step S171 and Step S172 can be skipped.

The processing of Step S171 and Step S172 corresponds to the master reconfiguration processing corresponding to the master absence event Ev3 at Step S170 of FIG. 13. First, the small cell control unit 134 selects at least one new master terminal that should operate the small cell, from the sub-master terminals already selected by the master selection unit 132 (Step S171). The small cell control unit 134 then instructs the operation of the small cell to the selected new master terminal (Step S172).

Figure 17B:
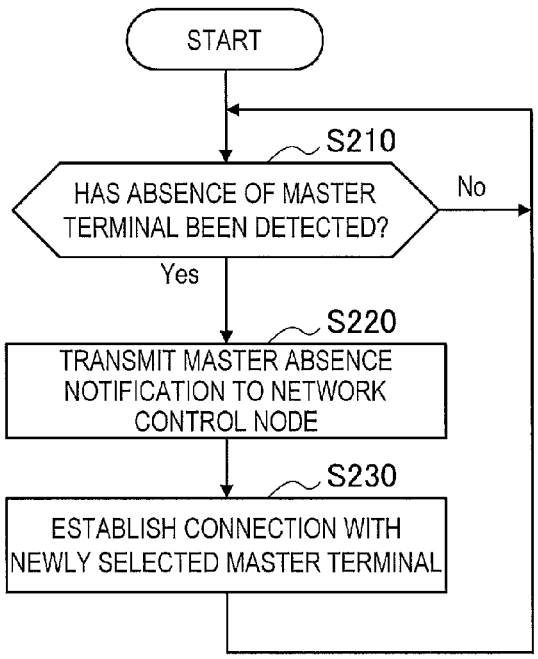
FIG. 17B is a flow chart illustrating an example of a detailed flow of processing in a macro cell base station related to the master absence event.

FIG. 17B is a flow chart illustrating an example of a detailed flow of the processing in the macro cell base station related to the master absence event. The processing here can be executed for each of the master terminals each having the backhaul link between itself and the macro cell base station.

The macro cell base station monitors the occurrence of the movement and the obstruction of each master terminal to determine the absence of the master terminal (Step S210). When the absence of the master terminal has been detected, the macro cell base station transmits the master absence notification to the networking control node 100 (Step S220). Then, the macro cell base station establishes the connection with the master terminal newly selected (Step S230). The communication link established here can be used as the backhaul link when the new master terminal operates the small cell.

<4. Configuration of Dynamic AP>

Figure 18:
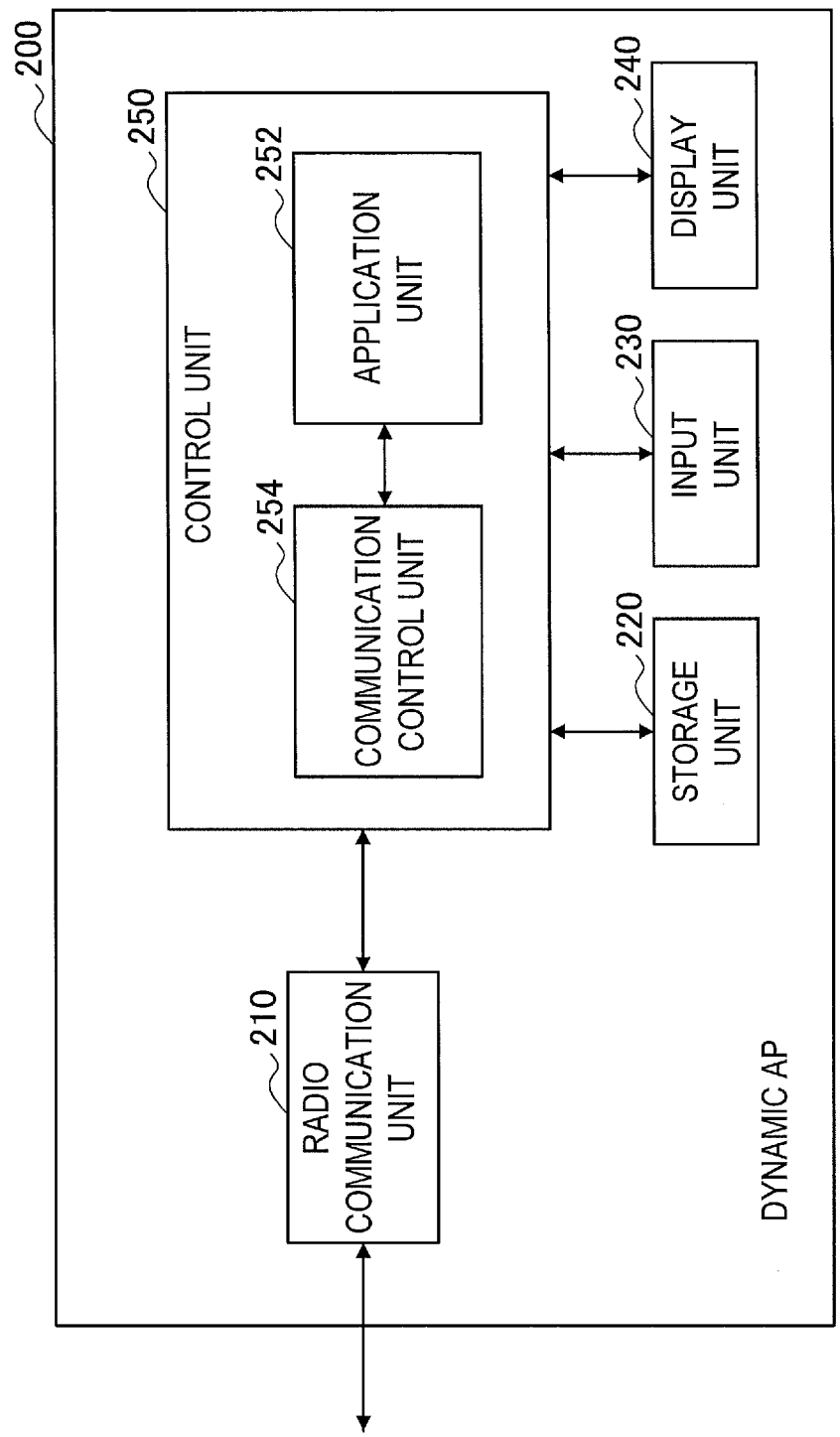
FIG. 18 is a block diagram illustrating an example of a configuration of the dynamic AP according to an embodiment.

FIG. 18 is a block diagram illustrating an example of the configuration of a dynamic AP 200 according to an embodiment. With reference to FIG. 18, the dynamic AP 200 includes a radio communication unit 210, a storage unit 220, an input unit 230, a display unit 240, and a control unit 250.

[3-1. Radio Communication Unit]

The radio communication unit 210 is a radio communication interface for executing the radio communication by the dynamic AP 200. When the dynamic AP 200 operates as the terminal apparatus, the radio communication unit 210 establishes the radio connection between itself and any base station to transmit and receive the radio signal. When the dynamic AP 200 operates as the access point, the radio communication unit 210 further establishes the access link between itself and other terminal apparatus to transmit and receive the radio signal on the access link. The access link may be operated by a time division duplex (TDD) system or a frequency division duplex (FDD) system on a time-frequency resource that can be assigned by the networking control node 100 or the base station. The radio communication unit 210 may have a plurality of antennas, and in this case, it is possible to form an antenna beam having directionality through precoding.

The radio communication unit 210 may previously have a unique mobile router function for operating as the access point. Instead, the radio communication unit 210 may operate as the access point by allowing a communication control unit 254 described later to execute a function module downloaded from an external server.

[3-2. Storage Unit]

The storage unit 220 stores a program and data for the operation of the dynamic AP 200 by using a storage medium such as a hard disk or a semiconductor memory. The data stored by the storage unit 220 can include the information on the terminal apparatus described above, information on the dynamic AP, and the information on the connection-destination cell, and the like. The program stored by the storage unit 220 can include the function module for the mobile router function.

[3-3. Input Unit]

The input unit 230 includes one or more input devices for inputting information to the dynamic AP 200 by a user. The input unit 230 may include, for example, a touch sensor integrated with the display unit 240. Further, the input unit 230 may include other types of input devices such as a key pad, a button, a switch, or a wheel.

[3-4. Display Unit]

The display unit 240 is a display module configured by a liquid crystal display (LCD) or an organic light-emitting diode (OLED), or the like. The display unit 240 displays, for example, a setting screen for setting the operation of the dynamic AP 200 by a user. A user interface for allowing a user to set the above described user approval flag via the input unit 230 and the display unit 240 may be provided.

[3-5. Control Unit]

The control unit 250 controls the overall operation of the dynamic AP 200 by using the processor such as the CPU or the DSP. In this embodiment, the control unit 250 includes an application unit 252, and the communication control unit 254.

(1) Application Unit

The application unit 252 executes an application. The application executed by the application unit 252 can include, for example, a communication application such as a voice call client, an Internet browser, a mailer or an SNS client.

(2) Communication Control Unit

The communication control unit 254 controls the radio communication by the dynamic AP 200. For example, the communication control unit 254, when the dynamic AP 200 operates as the terminal apparatus, allows the radio communication unit 210 to transmit an uplink signal and allows the radio communication unit 210 to receive a downlink signal. Further, the communication control unit 254 exchanges the signaling between itself and the networking control node 100 described above. For example, the communication control unit 254, when sufficient communication quality for the communication application is not obtained, may transmit a small cell installation request to the networking control node 100.

The dynamic AP 200 is potentially instructed from the networking control node 100 to operate the small cell as the master terminal. The communication control unit 254, when being instructed to operate the small cell from the networking control node 100, allows the radio communication unit 210 to operate as the access point for the small cell. The communication control unit 254 may refer to the user approval flag set in advance by a user in order to evaluate whether the operation of the small cell is approved by the user. The communication control unit 254, when the radio communication unit 210 does not have a unique mobile router function, may allow the radio communication unit 210 to operate as the access point by downloading a function module having a mobile router function from an external server and executing the downloaded function module. The communication control unit 254 may limit transmission power of the radio communication unit 210 so as to prevent the harmful interference to the existing cell, according to the instruction from the networking control node 100. The communication control unit 254 then allows the radio communication unit 210 to relay traffic between the connection destination cell (typically, the macro cell) and the terminal apparatus.

Further, the dynamic AP 200 is potentially notified of being selected as the sub-master terminal from the networking control node 100. After the dynamic AP 200 is selected as the sub-master terminal, when the event disturbing the operation of the small cell by the master terminal has occurred, the communication control unit 254 allows the dynamic AP200 to be involved in the operation of the small cell, according to the instruction from the networking control node 100. More specifically, for example, when the dynamic AP 200 is selected as the provisional master terminal according to the occurrence of the overload event Ev1, the communication control unit 254 allows the radio communication unit 210 to process a part of the traffic that has been processed by the master terminal, according to the load distribution system that can be designated by the networking control node 100. Further, when the dynamic AP200 is selected as the provisional master terminal according to the occurrence of the backhaul link quality deterioration event Ev2, the communication control unit 254 allows the radio communication unit 210 to substitute in the operation of the small cell, according to the instruction from the networking control node 100. Further, when the dynamic AP 200 is selected as the new master terminal according to the occurrence of the master absence event Ev3, the communication control unit 254 allows the radio communication unit 210 to start the operation of the new small cell, according to the instruction from the networking control node 100.

<5. Processing Sequence>

FIG. 19 to FIG. 22 illustrate some examples of a flow of the processing in the communication control system according to an embodiment. The communication control system to be described here can include one or more terminal apparatuses (UEs), one or more dynamic APs (DAPs), a macro cell base station (BS), and a networking control entity (NCE). Note that the networking control entity may be mounted on the physically same apparatus as the macro cell base station, or may be mounted on the different apparatus. When the networking control entity is included in the macro cell base station, the signaling between the networking control entity and the macro cell base station can be omitted in the figure. The dynamic AP and the terminal apparatus managed by the networking control entity may be the terminal apparatus positioned within the macro cell.

(1) Selection of Master/Sub-Master

FIG. 19 is a sequence diagram illustrating an example of a flow of the processing related to the selection of the master terminal and the sub-master terminal. With reference to FIG. 19, first, the small cell installation request is transmitted to the networking control entity by the macro cell base station or the terminal apparatus (Step S10). The networking control entity determines the need for the small cell according to the reception of the small cell installation request or actively (Step S11).

Next, the networking control entity, when it is determined that the need for the small cell is present, collects the dynamic AP-related information (Step S12). More specifically, the networking control entity can transmit an information request to the terminal apparatuses including the macro cell base station, the small cell base station and the dynamic AP to acquire the terminal information, the dynamic AP information and the existing cell information.

Next, the networking control entity uses the collected dynamic AP-related information to execute the master/sub-master selection processing described using FIG. 14 (step S13). The X master terminals and the Y sub-master terminals are thereby selected. Then, the networking control entity instructs the operation of the small cell to the dynamic AP selected as the master terminal (Step S14), and notifies the dynamic AP selected as the sub-master terminal of being selected as the sub-master terminal (Step S15). The dynamic AP selected as the master terminal starts the operation of the small cell according to the instruction from the networking control entity (Step S16).

Next, the networking control entity, when the operation of the new small cell is started by the master terminal, transmits a handover command to the terminal apparatus to be accommodated in the new small cell (Step S17). The terminal apparatus that has received the handover command executes handover to establish the connection between itself and the new small cell (Step S18).

(2) Overload Event

FIG. 20 is a sequence diagram illustrating an example of a flow of the processing related to the overload event. With reference to FIG. 20, first, the macro cell base station or the master terminal transmits the load index for the master terminal operating the small cell to the networking control entity (Step S31).

The networking control entity, when the load index indicates that the load level of the master terminal exceeds the threshold value, determines the execution of the load distribution (Step S32). Next, the networking control entity selects the provisional master terminal to be involved in the load distribution, from the one or more sub-master terminals (Step S33). Further, the networking control entity selects the load distribution system (Step S34). Then, the networking control entity instructs the load distribution to the master terminal and the provisional master terminal (Step S35). The instruction of the load distribution here can include the designation of the selected load distribution system.

The master terminal and the provisional master terminal start the load distribution according to the instruction from the networking control entity (Step S36). The networking control entity, when the load distribution is started by the master terminal and the provisional master terminal, transmits the handover command to the terminal apparatus to be connected to the provisional master terminal (Step S37). The terminal apparatus that has received the handover command executes the handover to switch a connection destination to the provisional master terminal (Step S38).

After that, the macro cell base station or the master terminal and the provisional master terminal continuously transmit the load index to the networking control entity (Step S39). The networking control entity, when the load index indicates that the load level of the small cell is below the threshold value, determines the end of the load distribution (Step S40). Then, the networking control entity commands the handover to the master terminal to the terminal apparatus connected to the provisional master terminal (Step S41). The terminal apparatus that has received the handover command executes the handover to switch a connection destination to the master terminal (Step S42). The networking control entity then instructs the end of the load distribution to the master terminal and the provisional master terminal (Step S43).

(3) Backhaul Link Quality Deterioration Event

Figure 21A:
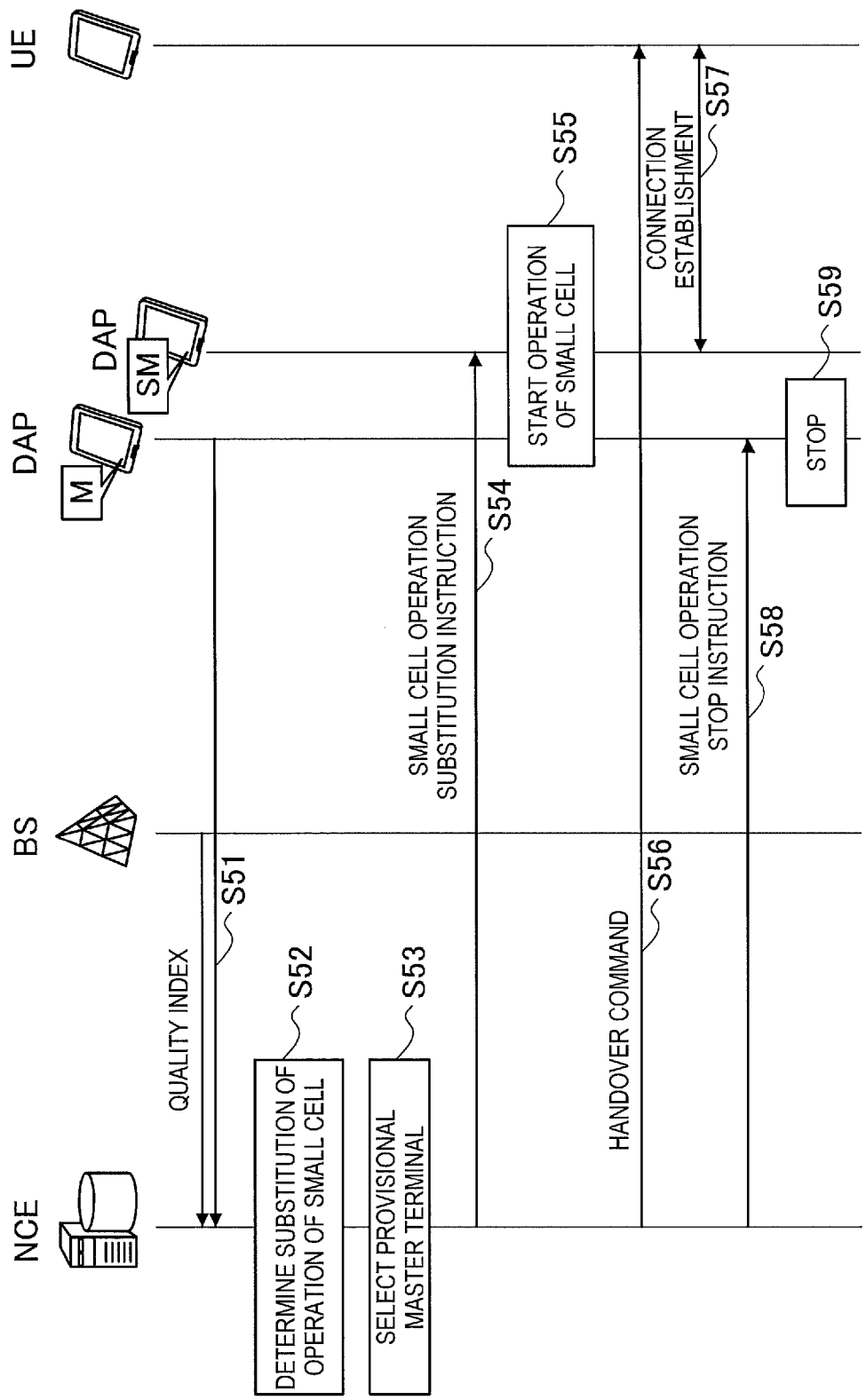
FIG. 21A is a first half part of a sequence diagram illustrating an example of a flow of processing related to the backhaul link quality deterioration event.
Figure 21B:
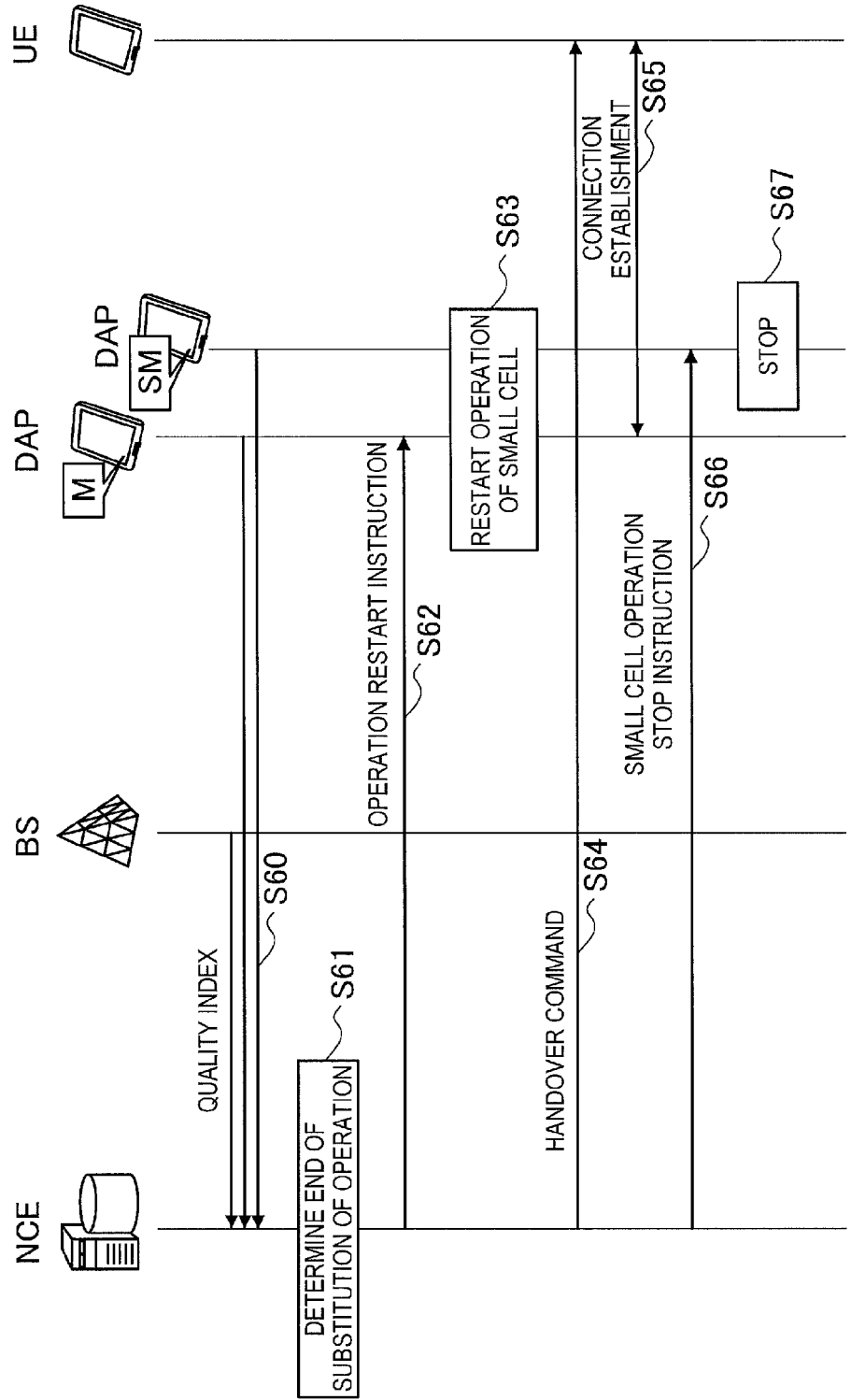
FIG. 21B is a second half part of the sequence diagram illustrating the example of the flow of the processing related to the backhaul link quality deterioration event.

FIG. 21A and FIG. 21B are a sequence diagram illustrating an example of a flow of the processing related to the backhaul link quality deterioration event. With reference to FIG. 21A, first, the macro cell base station or the master terminal transmits the quality index for the backhaul link of the master terminal to the networking control entity (Step S51).

The networking control entity, when the quality index indicates that the quality level of the backhaul link of the master terminal is below the threshold value, determines that the provisional master terminal should substitute in the operation of the small cell (Step S52). Next, the networking control entity selects the provisional master terminal from the one or more sub-master terminals (Step S53). Then, the networking control entity instructs the substitution of the operation of the small cell to the provisional master terminal (Step S54). The provisional master terminal starts the operation of the small cell according to the instruction from the networking control entity (Step S55).

Next, the networking control entity, when the operation of the small cell is started by the provisional master terminal, transmits the handover command to the terminal apparatus to be connected to the provisional master terminal (Step S56). The terminal apparatus that has received the handover command executes the handover to switch a connection destination to the provisional master terminal (Step S57). Further, the networking control entity, when receiving a handover completion report, instructs the stop of the operation of the small cell to the master terminal (Step S58). The master terminal stops the operation of the small cell according to the instruction from the networking control entity (Step S59).

With reference to FIG. 21B, after that, the macro cell base station or the master terminal and the provisional master terminal continuously transmit the quality index for the backhaul link to the networking control entity (Step S60). The networking control entity, when the quality index indicates that the quality level for the backhaul link of the master terminal exceeds the threshold value, determines the end of the substitution of the operation of the small cell (Step S61). Then, the networking control entity instructs the restart of the operation of the small cell to the master terminal (Step S62). The master terminal restarts the operation of the small cell according to the instruction from the networking control entity (Step S63).

Next, the networking control entity, when the operation of the small cell is restarted by the provisional master terminal, transmits the handover command to the terminal apparatus to be connected to the master terminal (Step S64). The terminal apparatus that has received the handover command executes the handover to switch a connection destination to the master terminal (Step S65). Further, the networking control entity, when receiving the handover completion report, instructs the stop of the operation of the small cell to the provisional master terminal (Step S66). The provisional master terminal stops the operation of the small cell according to the instruction from the networking control entity (Step S67).

(4) Master Absence Event

FIG. 22 is a sequence diagram illustrating an example of a flow of the processing related to the master absence event. With reference to FIG. 22, first, the macro cell base station or the terminal apparatus detects the absence of the master terminal that can be caused by the occurrence of the movement or the obstruction (Step S71). The macro cell base station or the terminal apparatus that has received the absence of the master terminal transmits the master absence notification to the networking control entity (Step S72).

The networking control entity, when the master absence notification has been detected, selects the new master terminal from the one or more sub-master terminals (Step S73). Then, the networking control entity instructs the operation of the small cell to the master terminal newly selected (Step S74). The master terminal newly selected starts the operation of the small cell according to the instruction from the networking control entity (Step S75).

Next, the networking control entity, when the operation of the small cell is started by the master terminal newly selected, transmits the handover command to the terminal apparatus to be connected to the master terminal (Step S76). The terminal apparatus that has received the handover command executes the handover to switch a connection destination to the master terminal newly selected (Step S77). Further, the networking control entity, since the number of the sub-master terminals is reduced, selects the new sub-master terminal by using the dynamic AP-related information (Step S78). The sub-master terminal is thereby replenished. Then, the networking control entity notifies the dynamic AP selected as the sub-master terminal of being selected as the sub-master terminal (Step S79).

<6. Application Examples>

The technology of the present disclosure is applicable to various products. For example, the networking control node 100 may be realized as any type of server such as a tower server, a rack server, and a blade server. The networking control node 100 may be a control module (such as an integrated circuit module including a single die, and a card or a blade that is inserted into a slot of a blade server) mounted on a server.

For example, the networking control entity may be mounted on any type of evolved Node B (eNB) such as a macro eNB, and a small eNB. The small eNB may be an eNB that covers a cell smaller than a macro cell, such as a pico eNB, micro eNB, or home (femto) eNB. Instead, the networking control entity may be mounted on other types of base stations such as a NodeB and a base transceiver station (BTS). The eNB may include a main body (that is also referred to as a base station apparatus) configured to control radio communication, and one or more remote radio heads (RRH) disposed in a different place from that of the main body.

For example, the dynamic AP 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The dynamic AP 200 may also be realized as a terminal (that is also referred to as a machine type communication (MTC) terminal) that performs machine-to-machine (M2M) communication. Furthermore, the dynamic AP 200 may be a radio communication module (such as an integrated circuit module including a single die) mounted on each of the terminals.

[6-1. Application Example Related to Networking Control Node]

Figure 23:
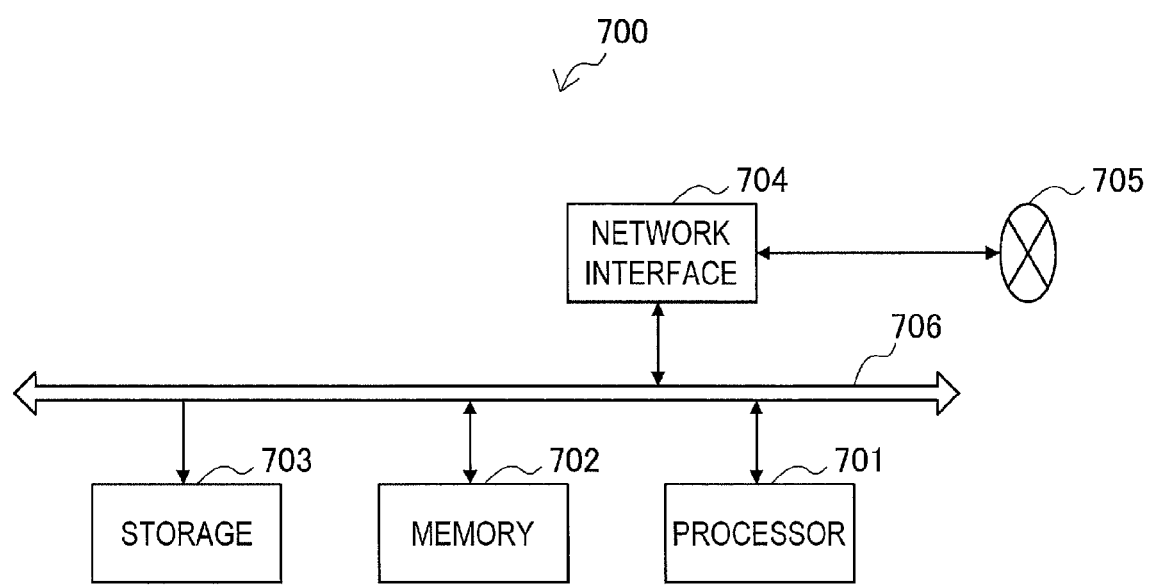
FIG. 23 is a block diagram illustrating an example of a schematic configuration of a server.

FIG. 23 is a block diagram illustrating an example of the schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes a random access memory (RAM) and a read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an evolved packet core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 23, the master selection unit and the small cell control unit 134 described using FIG. 7 may be mounted on the processor 701. For example, when the server 700 selects in advance the sub-master terminal as well as the master terminal operating the small cell, the stable operation of the small cell can be ensured.

[6-2. Application Examples Related to Base Station]

Figure 24:
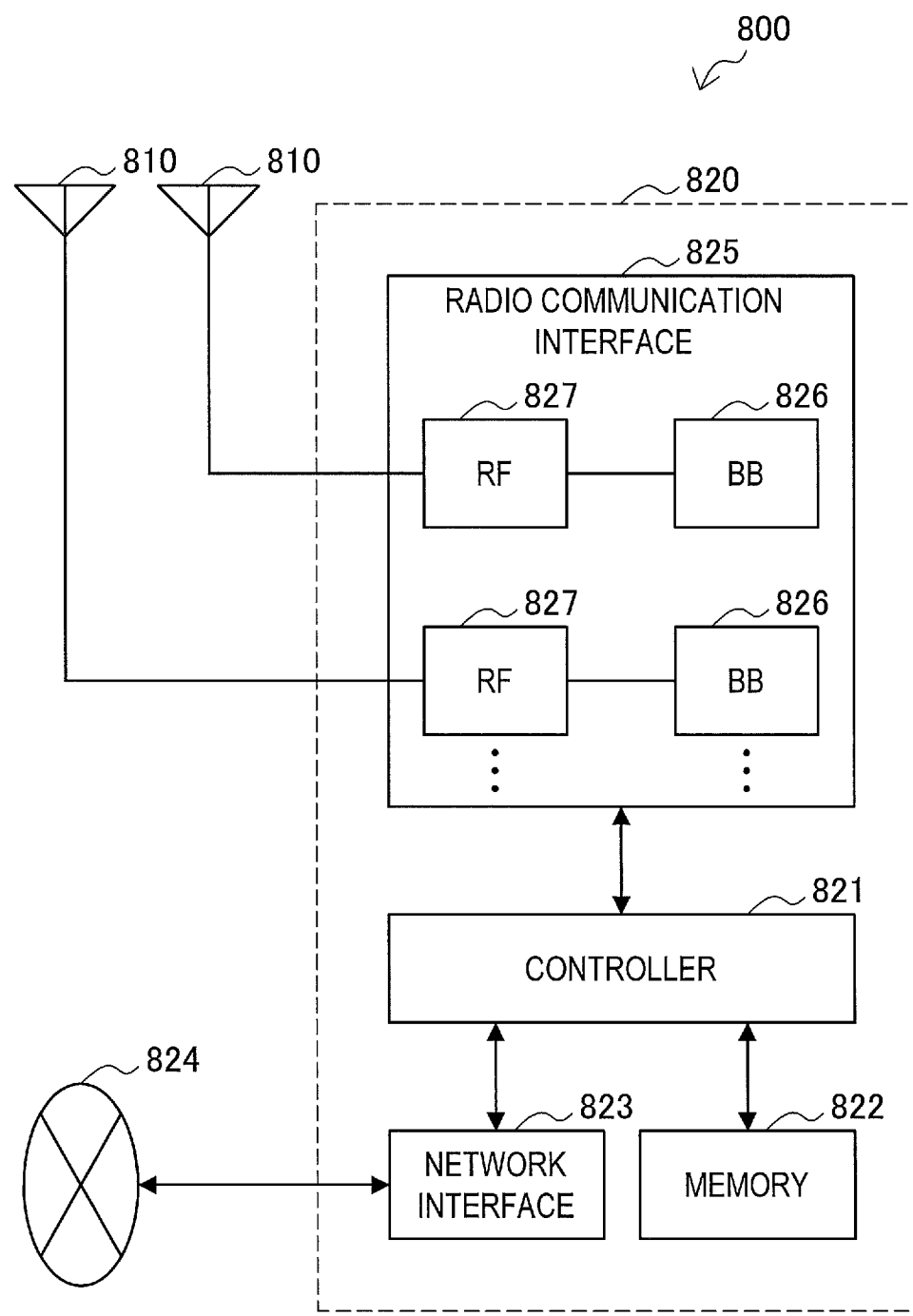
FIG. 24 is a block diagram illustrating an example of a schematic configuration of an eNB.

FIG. 24 is a block diagram illustrating an example of the schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 24. For example, the multiple antennas 810 may be compatible with multiple frequency bands used by the eNB 800, respectively. Note that FIG. 24 illustrates the example in which the eNB 800 includes the multiple antennas 810, but the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as long term evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 24. For example, the multiple BB processors 826 may be compatible with multiple frequency bands used by the eNB 800. The radio communication interface 825 may include the multiple RF circuits 827, as illustrated in FIG. 24. For example, the multiple RF circuits 827 may be compatible with multiple antenna elements, respectively. Note that FIG. 24 illustrates the example in which the radio communication interface 825 includes the multiple BB processors 826 and the multiple RF circuits 827, but the radio communication interface 825 may also include a single BB processor 826 or a single RF circuit 827.

In the eNB 800 shown in FIG. 24, the master selection unit 132 and the small cell control unit 134 described using FIG. 7 may be amounted, for example, on the controller 821. For example, when the eNB 800 selects in advance the sub-master terminal as well as the master terminal operating the small cell, the stable operation of the small cell can be ensured.

[6-3. Application Examples Related to Terminal Apparatus]
(First Application Example)

Figure 25:
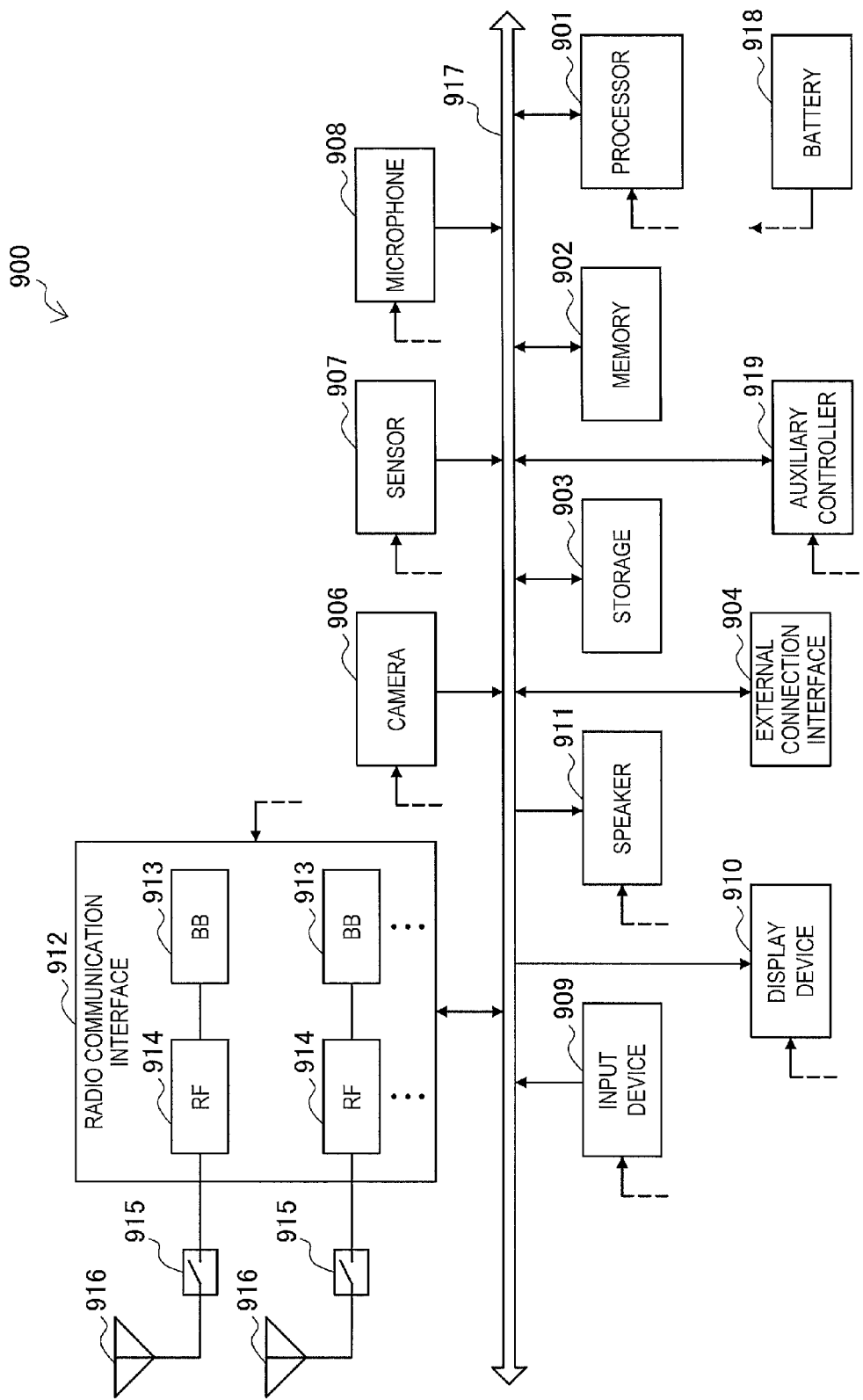
FIG. 25 is a block diagram illustrating an example of a schematic configuration of a smartphone.

FIG. 25 is a block diagram illustrating an example of the schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 25. Note that FIG. 25 illustrates the example in which the radio communication interface 912 includes the multiple BB processors 913 and the multiple RF circuits 914, but the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 25. Note that FIG. 25 illustrates the example in which the smartphone 900 includes the multiple antennas 916, but the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smart phone 900 shown in FIG. 25, the application unit 252 and the communication control unit 254 described using FIG. 18 may be amounted on the processor 901, the radio communication interface 912 or the auxiliary controller 919. For example, when the smart phone 900 plays a role as the sub-master terminal according to the instruction from the networking control node described above, the stable operation of the small cell can be ensured.

(Second Application Example)

Figure 26:
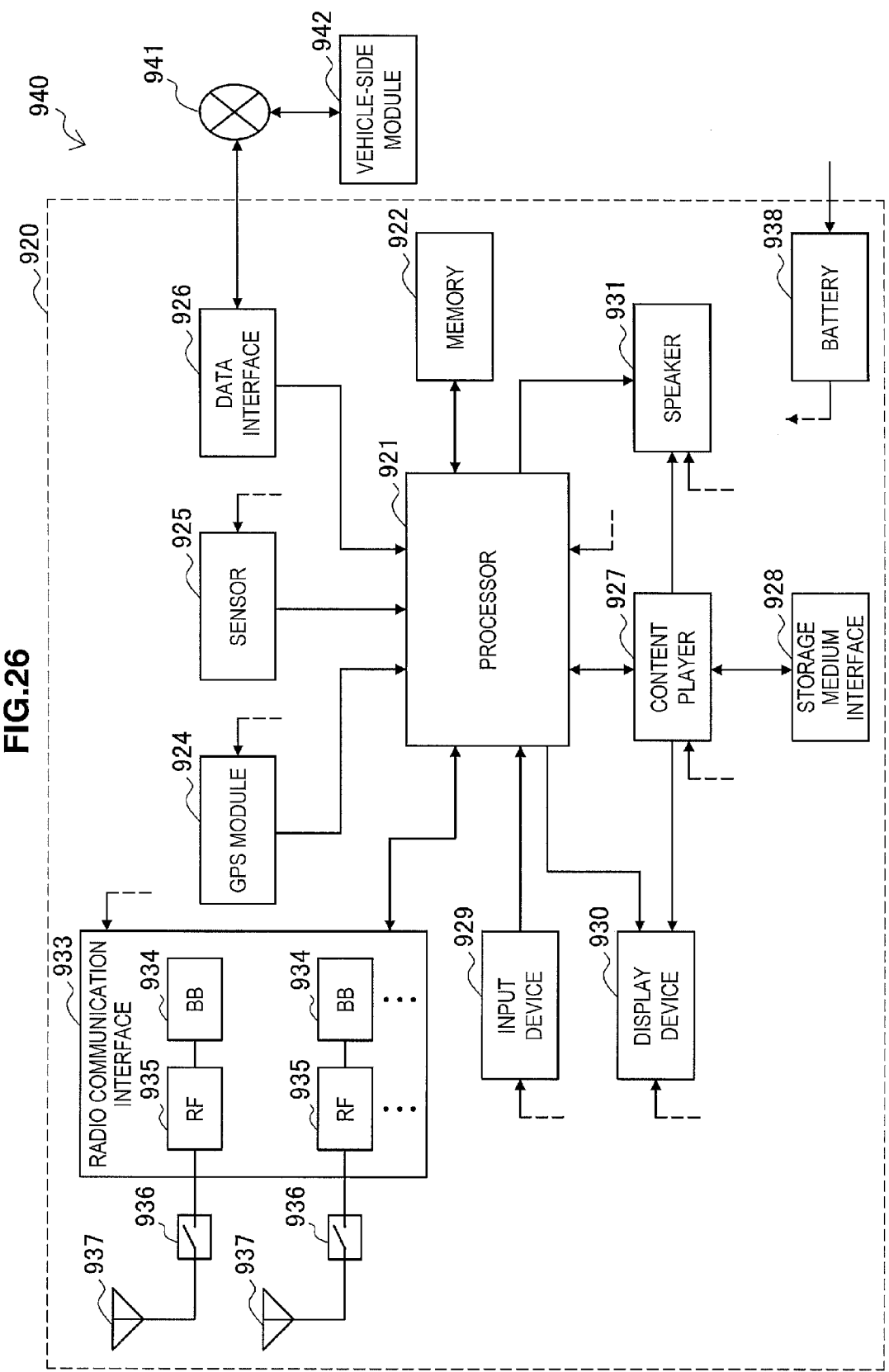
FIG. 26 is a block diagram illustrating an example of a schematic configuration of a car navigation apparatus.

FIG. 26 is a block diagram illustrating an example of the schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sound of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 26. Note that FIG. 26 illustrates the example in which the radio communication interface 933 includes the multiple BB processors 934 and the multiple RF circuits 935, but the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 26. Note that FIG. 26 illustrates the example in which the car navigation apparatus 920 includes the multiple antennas 937, but the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 26 via feeder lines that are partially shown as dashed lines in the figure. The battery 938 accumulates power supplied form the vehicle.

In the car navigation apparatus 920 shown in FIG. 24, the application unit 252 and the communication control unit 254 described using FIG. 18 may be amounted on the processor 921 or the radio communication interface 933. For example, when the car navigation apparatus 920 plays a role as the sub-master terminal according to the instruction from the networking control node described above, the stable operation of the small cell can be ensured.

The technology of the present disclosure may also be realized as an in-vehicle system (or a vehicle) 940 including one or more blocks of the car navigation apparatus 920, the in-vehicle network 941, and a vehicle-side module 942. The vehicle-side module 942 generates vehicle data such as vehicle speed, engine speed, and trouble information, and outputs the generated data to the in-vehicle network 941.

<7. Summary>

Up to here, the embodiments of the technology according to the present disclosure have been described in detail by using FIG. 1 to FIG. 26. According to the embodiments described above, the one or more sub-master terminals as well as the master terminal operating the small cell are selected in advance. The at least one sub-master terminal is involved in the operation of the small cell according to the occurrence of the event disturbing the operation of the small cell by the master terminal. During a period from the occurrence of the event to the involvement of the sub-master terminal, the processing such as the collection of the dynamic AP-related information and the recalculation of the communication efficiency score is not needed. Therefore, the significant signaling overhead for continuing the operation of the small cell after the occurrence of the event is not generated and the delay is also reduced. The stable operation of the small cell can be thereby ensured.

Further, according to the embodiments described above, the sub-master terminal can be selected in advance on the basis of the communication efficiency score as a measure of the communication efficiency assumed when operating the small cell. Therefore, even when the event disturbing the operation of the small cell by the master terminal has occurred, the operation of the small cell can be continued by using the sub-master terminal without a large decrease in communication efficiency as the whole network.

Moreover, according to the embodiments described above, the communication efficiency score can be calculated in terms of the system capacity or the communication quality. When the communication efficiency score is calculated in terms of the system capacity, even when the event has occurred, the system capacity can be maintained as much as possible by using the sub-master terminal, to process the large traffic as the whole network. When the communication efficiency score is calculated in terms of the communication quality, even when the event has occurred, the communication quality of the individual terminal apparatus can be maintained as much as possible by using the sub-master terminal, to provide a user with a higher communication rate.

Moreover, according to the embodiments described above, when the load of the master terminal operating the small cell has increased, the load of the master terminal is distributed by using the sub-master terminal. Therefore, it is possible to prevent the obstructions such as the delay of the traffic or the function stop of the master terminal from being brought due to the overload of the master terminal. This makes it easy to select the dynamic AP having performance being not always high as the master terminal, leading to more opportunities of the use of the dynamic AP.

Moreover, according to the embodiments described above, when the communication quality of the backhaul link of the master terminal operating the small cell has decreased, the sub-master terminal instead of the master terminal promptly substitutes in the operation of the small cell. Therefore, it is possible to prevent the obstructions such as the loss of the packet and the delay of the traffic from being brought due to the quality deterioration of the backhaul link.

Moreover, according to the embodiments described above, when the master terminal operating the small cell has become absent, that is, when the master terminal has been moved, or the master terminal has fallen into the communication inability, the sub-master terminal promptly starts the operation of the new small cell. Therefore, the length of the period in which the small cell is not available can be reduced to avoid the reduction in communication efficiency as the whole network.

Moreover, according to the embodiments described above, when the number of the master terminals or the sub-master terminals is reduced, the master terminal or the sub-master terminal is replenished. Therefore, even when the communication condition has variously changed, the stable operation of the small cell can be continued.

Note that the series of control processing by the respective apparatuses described herein may be implemented by using any of software, hardware, and a combination of software and hardware. Programs constituting the software are previously stored in, for example, a recording medium (or a non-transitory recording medium) provided in the inside or the outside of the respective apparatuses. And the respective programs are, for example, read into a random access memory (RAM) during execution and executed by the processor such as the CPU.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the technology according to the present disclosure may also be configured as below.

(1)

A communication control apparatus including:

a selection unit that uses information related to one or more terminal apparatuses operable as an access point for a small cell to select a master terminal operating the small cell and one or more sub-master terminals; and a control unit that instructs the at least one sub-master terminal to be involved in an operation of the small cell according to occurrence of an event disturbing the operation of the small cell by the master terminal.

(2)

The communication control apparatus according to (1), wherein the selection unit performs scoring of communication efficiency assumed when each of the one or more terminal apparatuses operates the small cell, and selects the master terminal and the sub-master terminal on the basis of a result of the scoring.

(3)

The communication control apparatus according to (2), wherein the selection unit uses at least one of an accommodated terminal count, an accommodated terminal communication amount and a size of coverage for each assumed small cell to perform the scoring of the communication efficiency.

(4)

The communication control apparatus according to (2), wherein the selection unit uses a quality index of an accommodated terminal for each assumed small cell to perform the scoring of the communication efficiency.

(5)

The communication control apparatus according to any one of (1) to (4), wherein, when the small cell is operated for improving communication quality for a specific terminal, the selection unit selects the terminal apparatus that is able to include a current position of the specific terminal in coverage of the small cell, as the master terminal or the sub-master terminal.

(6)

The communication control apparatus according to any one of (1) to (5), wherein the control unit allows the at least one sub-master terminal to process a part of traffic that has been processed by the master terminal, according to occurrence of a first event indicating an increase in a load of the master terminal operating the small cell.

(7)

The communication control apparatus according to (6), wherein the control unit gives an instruction regarding a load distribution system to be used to the master terminal and the at least one sub-master terminal, according to occurrence of the first event.

(8)

The communication control apparatus according to (6) or (7), wherein the control unit uses a load index received from the master terminal or a macro cell base station to determine occurrence of the first event.

(9)

The communication control apparatus according to any one of (1) to (8), wherein, according to occurrence of a second event indicating a decrease in quality of a backhaul link of the master terminal operating the small cell, the control unit allows the master terminal to stop an operation of the small cell, and allows the at least one sub-master terminal to operate the small cell.

(10)

The communication control apparatus according to (9), wherein the control unit uses a quality index for the backhaul link of the master terminal to determine occurrence of the second event.

(11)

The communication control apparatus according to (10), wherein the control unit uses a quality index for a backhaul link for each of the one or more sub-master terminals selected by the selection unit, to select the at least one sub-master terminal that should operate the small cell.

(12)

The communication control apparatus according to any one of (1) to (11), wherein the control unit allows the at least one sub-master terminal to operate the small cell according to occurrence of a third event indicating absence of the master terminal operating the small cell.

(13)

The communication control apparatus according to (12), wherein the control unit uses a master absence notification received via a macro cell base station connected to the master terminal, to determine occurrence of the third event.

(14)

The communication control apparatus according to (12), wherein the control unit uses a master absence notification received from a slave terminal connected to the master terminal, to determine occurrence of the third event.

(15)

The communication control apparatus according to any one of (12) to (14), wherein the selection unit reselects at least one of the master terminal and the one or more sub-master terminals according to occurrence of the third event, according to a decrease in a master terminal count or a sub-master terminal count, or periodically.

(16)

The communication control apparatus according to any one of (1) to (15), wherein the selection unit selects the plurality of master terminals, and wherein the plurality of master terminals selected operate the small cell by using cooperative transmission technology.

(17)

The communication control apparatus according to any one of (1) to (16), wherein the communication control apparatus is a base station that operates a macro cell, and wherein the one or more terminal apparatuses are positioned within the macro cell.

(18)

A communication control method including:

using information related to one or more terminal apparatuses operable as an access point for a small cell to select a master terminal operating the small cell and one or more sub-master terminals; and instructing the at least one sub-master terminal to be involved in an operation of the small cell according to occurrence of an event disturbing the operation of the small cell by the master terminal.

(19)

A program that allows a computer that controls a communication control apparatus to function as:

a selection unit that uses information related to one or more terminal apparatuses operable as an access point for a small cell to select a master terminal operating the small cell and one or more sub-master terminals; and a control unit that instructs the at least one sub-master terminal to be involved in an operation of the small cell according to occurrence of an event disturbing the operation of the small cell by the master terminal.

(20)

A terminal apparatus operable as an access point for a small cell, the terminal apparatus including:

a communication unit that communicates with a communication control apparatus that selects a master terminal operating a small cell, and one or more sub-master terminals; and a control unit that, after the terminal apparatus is selected as the sub-master terminal by the communication control apparatus, when an event disturbing an operation of the small cell by the master terminal occurs, allows the terminal apparatus to be involved in an operation of the small cell according to an instruction from the communication control apparatus.

REFERENCE SIGNS LIST 100 communication control apparatus
132 master selection unit
134 small cell control unit
200 terminal apparatus (dynamic access point)
210 communication unit
254 communication control unit

The invention claimed is:

1. A communication control apparatus, comprising:
a selection unit configured to:
determine a score of communication efficiency for each of a plurality of terminal apparatuses that are operable as an access point for a small cell, wherein the score is determined based on at least one of an accommodated terminal count, an accommodated terminal communication amount or a size of coverage of the small cell;
select from the plurality of terminal apparatuses, based on the determined score, a master terminal to operate the small cell, and at least one sub-master terminal; and
a control unit configured to instruct the selected at least one sub-master terminal to be involved in an operation of the small cell based on an interruption in the operation of the small cell by the selected master terminal.

2. The communication control apparatus according to claim 1,
wherein the selection unit is further configured to determine the score based on a quality index of an accommodated terminal for the small cell.

3. The communication control apparatus according to claim 1,
wherein, based on the small cell being operated to improve communication quality for a specific terminal, the selection unit is further configured to select a first terminal apparatus that is able to include a current position of the specific terminal in coverage of the small cell, as the master terminal or the sub-master terminal.

4. The communication control apparatus according to claim 1,
wherein, based on an increase in a load of the master terminal, the control unit is further configured to allow the at least one sub-master terminal to process a part of traffic that has been processed by the master terminal.

5. The communication control apparatus according to claim 4,
wherein, based on the increase in the load of the master terminal, the control unit is further configured to give an instruction related to a load distribution system to the master terminal and the at least one sub-master terminal.

6. The communication control apparatus according to claim 4,
wherein the control unit is further configured to determine the increase in the load of the master terminal based on a load index received from the master terminal or a macro cell base station.

7. The communication control apparatus according to claim 1,
wherein, based on a decrease in quality of a first backhaul link of the master terminal that operates the small cell, the control unit is further configured to:
allow the selected master terminal to stop the operation of the small cell; and
allow the at least one sub-master terminal to operate the small cell.

8. The communication control apparatus according to claim 7,
wherein the control unit is further configured to determine the decrease in the quality of the first backhaul link of the master terminal based on a first quality index for the first backhaul link of the master terminal.

9. The communication control apparatus according to claim 8,
wherein the control unit is further configured to select the at least one sub-master terminal to operate the small cell based on a second quality index for a corresponding second backhaul link for each of the at least one sub-master terminal selected by the selection unit.

10. The communication control apparatus according to claim 1,
wherein, based on an absence of the master terminal that operates the small cell, the control unit is further configured to allow the at least one sub-master terminal to operate the small cell.

11. The communication control apparatus according to claim 10,
wherein the control unit is further configured to determine the absence of the master terminal based on a master absence notification received via a macro cell base station connected to the master terminal.

12. The communication control apparatus according to claim 10,
wherein the control unit is further configured to determine the absence of the master terminal based on a master absence notification received from a slave terminal connected to the master terminal.

13. The communication control apparatus according to claim 10,
wherein the selection unit is further configured to select a different master terminal based on the absence of the master terminal.

14. The communication control apparatus according to claim 1,
wherein the selection unit is further configured to select a plurality of master terminals, and
wherein the plurality of master terminals operate the small cell based on a cooperative transmission technology.

15. The communication control apparatus according to claim 1,
wherein the communication control apparatus is a base station configured to operate a macro cell, and
wherein the plurality of terminal apparatuses are positioned within the macro cell.

16. A communication control method, comprising:
determining a score of communication efficiency for each of a plurality of terminal apparatuses that are operable as an access point for a small cell, wherein the score is determined based on at least one of an accommodated terminal count, an accommodated terminal communication amount or a size of coverage of the small cell;
selecting from the plurality of apparatuses, based on the determined score, a master terminal operating the small cell, and at least one sub-master terminal; and
instructing the selected at least one sub-master terminal to be involved in an operation of the small cell based on an interruption in the operation of the small cell by the selected master terminal.

17. A non-transitory computer-readable medium having stored thereon, computer-executable instructions for causing a computer that controls a communication control apparatus to execute operations, the operations comprising:
determining a score of communication efficiency for each of a plurality of terminal apparatuses that are operable as an access point for a small cell, wherein the score is determined based on at least one of an accommodated terminal count, an accommodated terminal communication amount or a size of coverage of the small cell;
selecting from the plurality of apparatuses, based on the determined score, a master terminal operating the small cell, and at least one sub-master terminal; and
instructing the selected at least one sub-master terminal to be involved in an operation of the small cell based on an interruption in the operation of the small cell by the selected master terminal.

18. A terminal apparatus, comprising:
a communication unit configured to communicate with a communication control apparatus that selects a master terminal to operate small cell, and at least one sub-master terminal, wherein the master terminal and the at least one sub-master terminal is selected based on a score of communication efficiency for each of a plurality of terminal apparatuses that are operable as an access point for the small cell, wherein the score is determined based on at least one of an accommodated terminal count, an accommodated terminal communication amount or a size of coverage of the small cell; and
a control unit configured to, allow the terminal apparatus to be involved in an operation of the small cell based on an instruction from the communication control apparatus, wherein the terminal apparatus is allowed to operate the small cell based on a selection of the terminal apparatus as the at least one sub-master terminal.

* * * * *